US012291763B2

(12) United States Patent
Li et al.

(10) Patent No.: US 12,291,763 B2
(45) Date of Patent: May 6, 2025

(54) HIGH-STRENGTH AND TOUGH MULTI-COMPONENT SOFT MAGNETIC ALLOY AND PREPARATION METHOD THEREOF

(71) Applicant: Central South University, Changsha (CN)

(72) Inventors: Zhiming Li, Changsha (CN); Penghua Ge, Changsha (CN); Dingshun Yan, Changsha (CN); Kefu Gan, Changsha (CN); Yong Zhang, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 18/704,911

(22) PCT Filed: Jul. 10, 2023

(86) PCT No.: PCT/CN2023/106580

§ 371 (c)(1),
(2) Date: Apr. 25, 2024

(87) PCT Pub. No.: WO2024/082723

PCT Pub. Date: Apr. 25, 2024

(65) Prior Publication Data

US 2024/0327959 A1 Oct. 3, 2024

(30) Foreign Application Priority Data

Oct. 21, 2022 (CN) ........................ 202211294689.4

(51) Int. Cl.
*C22C 30/00* (2006.01)
*C22C 1/02* (2006.01)
(Continued)

(52) U.S. Cl.
CPC ................ *C22C 30/00* (2013.01); *C22C 1/02* (2013.01); *C22F 1/16* (2013.01); *H01F 1/14708* (2013.01); *C22C 2202/02* (2013.01)

(58) Field of Classification Search
None
See application file for complete search history.

(56) References Cited

U.S. PATENT DOCUMENTS

2008/0031769 A1 2/2008 Yeh
2009/0242083 A1 * 10/2009 Ishida .................. H01F 1/0308 148/508
2020/0354820 A1 11/2020 Yang et al.

FOREIGN PATENT DOCUMENTS

CN 111074100 A 4/2020
CN 112322940 A 2/2021
(Continued)

OTHER PUBLICATIONS

Yong Zhang et al., High-entropy Alloys with High Saturation Magnetization, Electrical Resistivity, and Malleability, Scientific Reports, 2013, vol. 3, No. 1455, p. 1-7.
(Continued)

*Primary Examiner* — Brian D Walck
(74) *Attorney, Agent, or Firm* — Margaret A. Burke; Sam T. Yip; IDEA Intellectual Limited

(57) ABSTRACT

A high-strength and tough multi-component soft magnetic alloy and preparation method thereof are provided. The high-strength and tough multi-component soft magnetic alloy is composed of the following components in atomic percentage: Fe 32-45%, Co 24-29%, Ni 24-29%, Al 2.5-8%, Ti 1.5-3.5%, Ta 1.0-5%, Nb 0-2%, and Mo 0-2%. The multi-component alloys prepared by the present invention exhibit a face-centered cubic structure of the matrix, featured with high strength, high ductility, low coercivity and relatively high saturation magnetization. These properties make it suitable for manufacturing critical components for applications in industries such as electrical engineering, automatic control, mobile communications, and others.

4 Claims, 26 Drawing Sheets

(51) Int. Cl.
*C22F 1/16* (2006.01)
*H01F 1/147* (2006.01)

(56) References Cited

FOREIGN PATENT DOCUMENTS

| | | | |
|---|---|---|---|
| CN | 113549801 | A | 10/2021 |
| CN | 113737078 | A | 12/2021 |
| CN | 115691931 | A | 2/2023 |

OTHER PUBLICATIONS

Yue Ma et al., A Novel Soft-Magnetic B2-Based Multiprincipal-Element Alloy with a Uniform Distribution of Coherent Body-Centered-Cubic Nanoprecipitates, Advanced Materials, 2021, vol. 33, No. 2006723, p. 1-7.
Zhiqiang Fu et al., Influence of heat treatment on microstructure, mechanical behavior, and soft magnetic properties in an fcc-based Fe29Co28Ni29Cu7Ti7 high-entropy alloy, Journal of Materials Research, 2018, vol. 33, p. 2214-2222.
Chenglei Wang et al., Development of the y' phase strengthened high-temperature high-entropy alloys with excellent mechanical properties, Materials & Design, 2022, vol. 221, No. 110940, p. 1-11.
Y. Tanaka et al., Alloy Design for Fe—Ni—Co—Al-based Superelastic Alloys, Materials Today: Proceedings, 2015, vol. 2S, p. 485-492.

* cited by examiner

HIGH-STRENGTH AND TOUGH MULTI-COMPONENT SOFT MAGNETIC ALLOY AND PREPARATION METHOD THEREOF

TECHNICAL FIELD

The present invention relates to a metal material preparation technology field, and specifically relates to a high-strength and tough multi-component soft magnetic alloy and preparation method thereof.

BACKGROUND

Soft magnetic alloys refer to materials that can quickly respond to changes in an applied magnetic field and obtain a high magnetic flux density with low loss. Soft magnetic materials exhibit characteristics such as low coercivity, high magnetic permeability, and high saturation magnetization. They are easily magnetized and demagnetized under external magnetic fields and are widely used in the power industry and electronic devices. Currently, there are many types of commercial soft magnetic alloys, but their applications are quite limited due to challenges in meeting the requirements of complex processing or highly mechanical loading. Therefore, there is an urgent need in industry for advanced soft magnetic materials with excellent mechanical properties to be applied in environments with severe mechanical loads.

Multi-component high-entropy alloys typically contain four or more elements, and the content of each element is between 35 at.-% to 5 at.-%. They often have excellent comprehensive properties and thus have attracted attention. Multi-component high-entropy alloys have a broad compositional space and controllable microstructure, which are conducive to optimizing the mechanical and physical properties of the alloy. In addition, multi-component high-entropy alloys have higher lattice distortion, which affects the movement of dislocations and magnetic domain walls, thereby affecting the mechanical and physical properties of the alloy.

In recent years, researchers have studied the soft magnetic and mechanical properties of advanced high-entropy alloys. For example, Zhang et al. [Y. Zhang, T. T. Zuo, Y. Q. Cheng, P. K. Liaw, Sci. Rep. 3 (2013) 1-7.] reported that FeCoNi$(AlSi)_{0.2}$ high-entropy alloy has a coercivity of 1400 A/m, saturation magnetization intensity of 1.15 T, compressive yield strength of 342.4 MPa, and compressive fracture strain greater than 50%. Ma et al. [Y. Ma, Q. Wang, X. Y. Zhou, J. M. Hao, B. Gault, Q. Y. Zhang, C. Dong, T. G. Nieh, Adv. Mater. 33 (2021) 2006723.] reported that $Al_{1.5}Co_4Fe_2Cr$ high-entropy alloy has a coercivity of 127.3 A/m, which is close to traditional soft magnetic alloys, and a saturation magnetization of 135.3 $A\cdot m^2/kg$. However, these high-entropy alloys still have issues such as lower ductility [Z. Q. Fu, S. G. Ma, G. Z. Yuan, Z. H. Wang, H. J. Wang, H. J. Yang, J. W. Qiao, J. Mater. Res. 33 (2018) 2214-2222] and inadequate machinability.

Increasing the strength of alloys requires introducing defects such as dislocations, grain boundaries, and precipitates. However, these defects also interact with magnetic domain walls, increasing coercivity and compromising the excellent soft magnetic properties of the material. Currently, many studies are stuck in the dilemma of balancing mechanical properties and soft magnetic properties. How to achieve excellent matching of mechanical and soft magnetic properties is a difficult point in the development of soft magnetic materials. In summary, the development of multi-component soft magnetic alloys with high strength, high ductility, low coercivity, and high saturation magnetization still faces severe technical challenges.

SUMMARY OF INVENTION

The purpose of this section is to outline some aspects of the embodiments of the present invention and to provide a brief introduction to some preferred embodiments. In this section, as well as in the abstract and the title of the present application, simplifications or omissions may be made to avoid obscuring the objectives of this section, the abstract, and the title of the invention, and such simplifications or omissions should not be construed as limiting the scope of the present invention.

Given the issues existing in the above and/or prior art, the present invention is proposed.

An objective of the present invention is to provide a high-strength and tough multi-component soft magnetic alloy.

To solve the above-mentioned technical problems, the present invention provides the following technical solutions: a high-strength and tough multi-component soft magnetic alloy, composed of following components in atomic percentage: Fe 32-45%, Co 24-29%, Ni 24-29%, Al 2.5-8%, Ti 1.5-3.5%, Ta 1.0-5%, Nb 0-2%, and Mo 0-2%;

a sum of the atomic percentages of Al, Ti, Ta, Nb, and Mo is ≤16% and ≥5%; a sum of the atomic percentages of Fe, Co, and Ni is ≥84% and ≤95%; and a sum of the atomic percentages of all the components is 100%.

As a preferred embodiment of the high-strength and tough multi-component soft magnetic alloy of the present invention, the soft magnetic alloy has characteristics as follows:

(i) Tensile yield strength of 350 to 1350 MPa;

(ii) Tensile strength of 600 to 1850 MPa;

(iii) Fracture elongation of 15 to 70%;

(iv) Saturation magnetization of the alloy from 90 to 140 $A\cdot m^2/kg$;

(v) Coercivity of 40 to 650 A/m.

Another objective of the present invention is to provide a preparation method for the high-strength and tough multi-component soft magnetic alloys as described above, the method comprises proportionally selecting raw materials of each of the components according to the atomic percentage of the alloy, melting them under a vacuum or inert gas protection conditions, casting them to obtain ingots, and subjecting the ingots to a hot rolling process and heat treatments to obtain the target alloys.

As a preferred embodiment of the preparation method for the high-strength and tough multi-component soft magnetic alloy, when the melting is performed under the vacuum conditions, it is to maintain the vacuum degree inside a furnace at 1 to 0.0001 pascal (Pa).

As a preferred embodiment of the preparation method for the high-strength and tough multi-component soft magnetic alloy, when the melting is performed under the inert gas protection conditions, it is to maintain the inert gas pressure inside the furnace at 0.000001 to 5 megapascals.

As a preferred embodiment of the preparation method for the high-strength and tough multi-component soft magnetic alloy, with respect to the melting, it is performed at a melting temperature of 1623 to 2473 K, with a holding time of 0.01 to 1 hour.

As a preferred embodiment of the preparation method for the high-strength and tough multi-component soft magnetic alloy, the hot rolling process employs multiple passes at temperatures ranging from 1173K to 1473K, with a single pass thickness reduction ratio of ≤25% per pass and a total thickness reduction ratio of 30% to 80%.

As a preferred embodiment of the preparation method for the high-strength and tough multi-component soft magnetic alloy, the heat treatments involve homogenization treatment or multiple aging treatments following the homogenization.

As a preferred embodiment of the preparation method for the high-strength and tough multi-component soft magnetic alloy, the homogenization treatment is conducted at a temperature of 1173 to 1523 K for a duration of 10 to 600 minutes.

As a preferred embodiment of the preparation method for the high-strength and tough multi-component soft magnetic alloy, the aging treatment is conducted at a temperature of 923 to 1273 K for a duration of 0.1 to 100 hours.

As compared with existing technology, the present invention has the following beneficial effects:

The multi-component alloys prepared by the present invention exhibit a face-centered cubic structure of the matrix, possessing low coercivity, high saturation magnetization and excellent strength and ductility combination. It can be fabricated into essential components applied in industries such as electrical power, automatic control, mobile communication, and other fields.

BRIEF DESCRIPTION OF DRAWINGS

To provide a clearer explanation of the technical solutions of the embodiments of the present invention, a brief description to the drawings required for the description of the embodiments will be provided below. It is evident that the drawings described below are only some embodiments of the present invention. For those skilled in the art, without exercising inventive effort, other drawings can be obtained based on these drawings. Wherein.

DETAILED DESCRIPTION OF THE INVENTION

To ensure that the objectives, features, and advantages of the present invention are more clearly understood, detailed descriptions of specific embodiments of the present invention are provided below in conjunction with the accompanying drawings.

Many specific details are described below to facilitate a comprehensive understanding of the present invention. However, the present invention can also be implemented in other ways different from those described herein. Those skilled in the art can make similar extensions without departing from the scope of the present invention. Therefore, the present invention is not limited to the specific embodiments disclosed below.

Furthermore, the term "an embodiment" or "an example" as used herein refers to specific compositions, structures, or properties that may be included in at least one embodiment of the present invention. The phrase "in one embodiment" appearing at various locations in this specification does not necessarily refer to the same embodiment, and is not intended to be mutually exclusive or selective with respect to other embodiments.

Embodiment 1

According to the chemical formula $Fe_{36.4}Co_{27.3}Ni_{27.3}Al_5Ti_{2.5}Ta_{1.5}$ (atomic percentages), the ingredients are prepared using pure metal blocks. They are then subjected to suspension melting, conducted under an inert gas protective atmosphere, with the process repeated four times. During melting, the vacuum is reduced to 0.001 Pa before argon is injected to achieve a slight positive pressure. The melt is maintained at 1873 K for 5 minutes, and is subsequently cast into a rectangular shape to obtain an ingot.

The obtained ingot undergoes multiple hot rolling processes. The hot rolling temperature is 1473 K, with a single pass thickness reduction of 10% and a total thickness reduction of 50%.

The hot-rolled alloy blocks are subjected to high-temperature homogenization treatment under an argon protective atmosphere (argon pressure of 10 Pa). The temperature is set at 1423 K, and the homogenization treatment is for 30 minutes before quenching with water. The homogenized block material is then cut to obtain the multi-component soft magnetic alloy of Embodiment 1.

Figure 1:
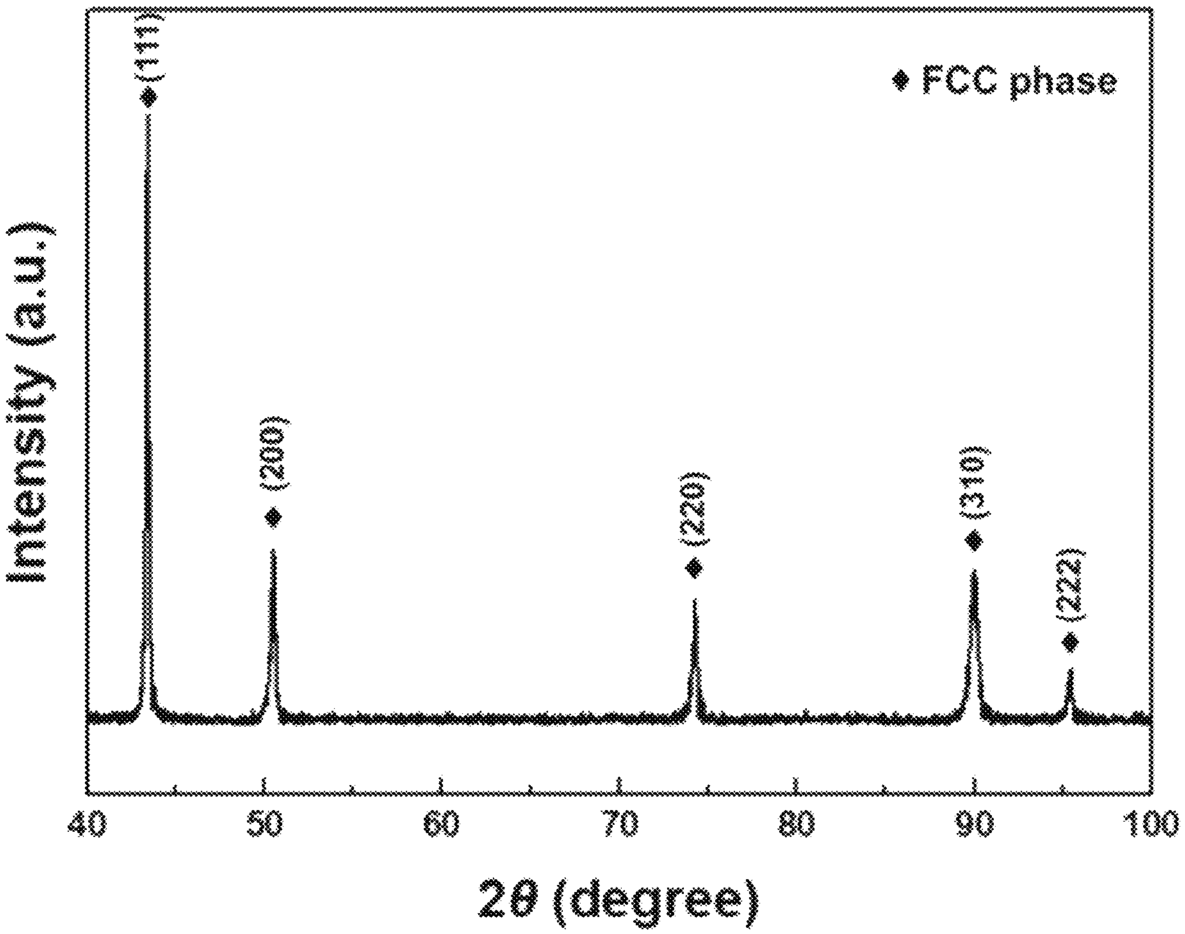
FIG. 1 shows the X-ray diffraction (XRD) spectrum of the multi-component soft magnetic alloy obtained according to embodiment 1 of the present invention.

The XRD spectrum of the obtained multi-component soft magnetic alloy is shown in FIG. 1, indicating that the alloy primarily exhibits a face-centered cubic (FCC) solid solution structure.

Figure 2:
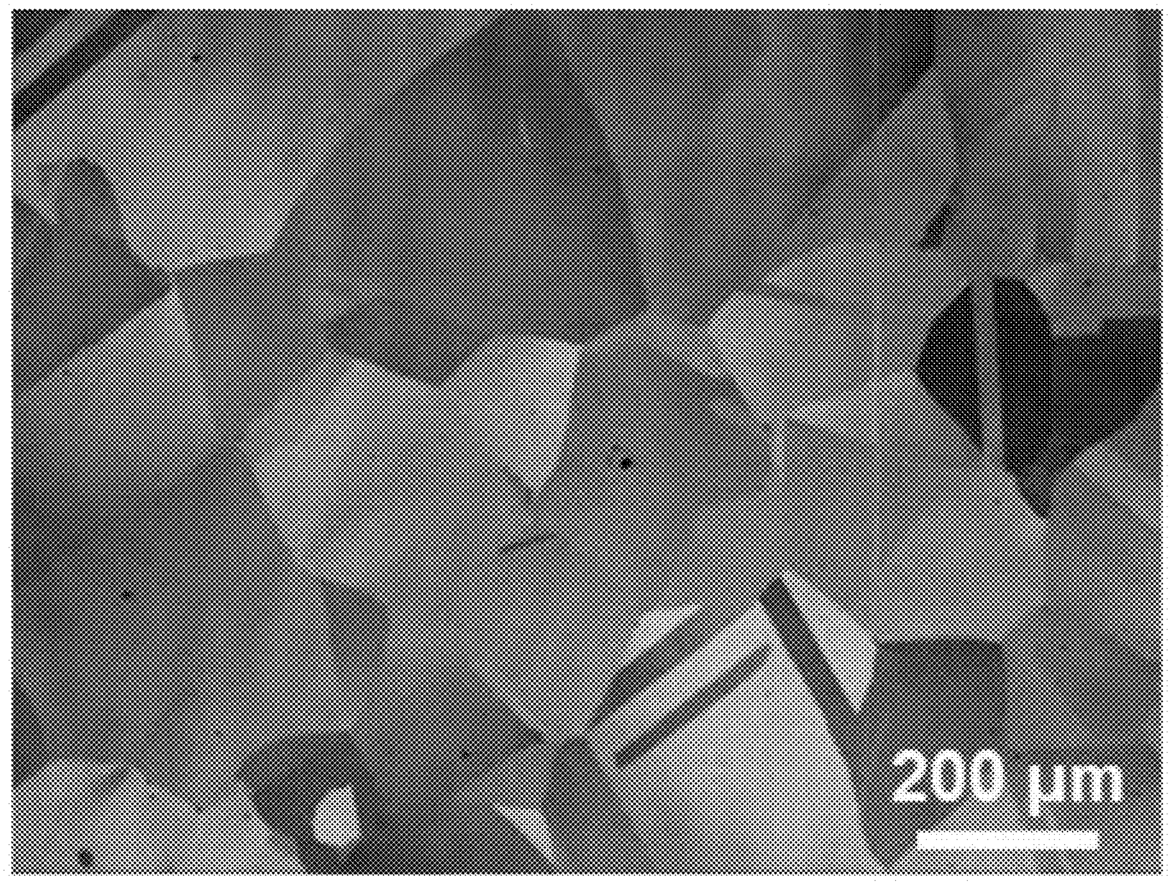
FIG. 2 depicts the scanning electron microscopy (SEM) image of the microstructure of the multi-component soft magnetic alloy obtained according to embodiment 1 of the present invention.

The SEM image of the obtained multi-component soft magnetic alloy microstructure is shown in FIG. 2, revealing the presence of numerous annealing twins in the alloy obtained in this embodiment.

Figure 3:
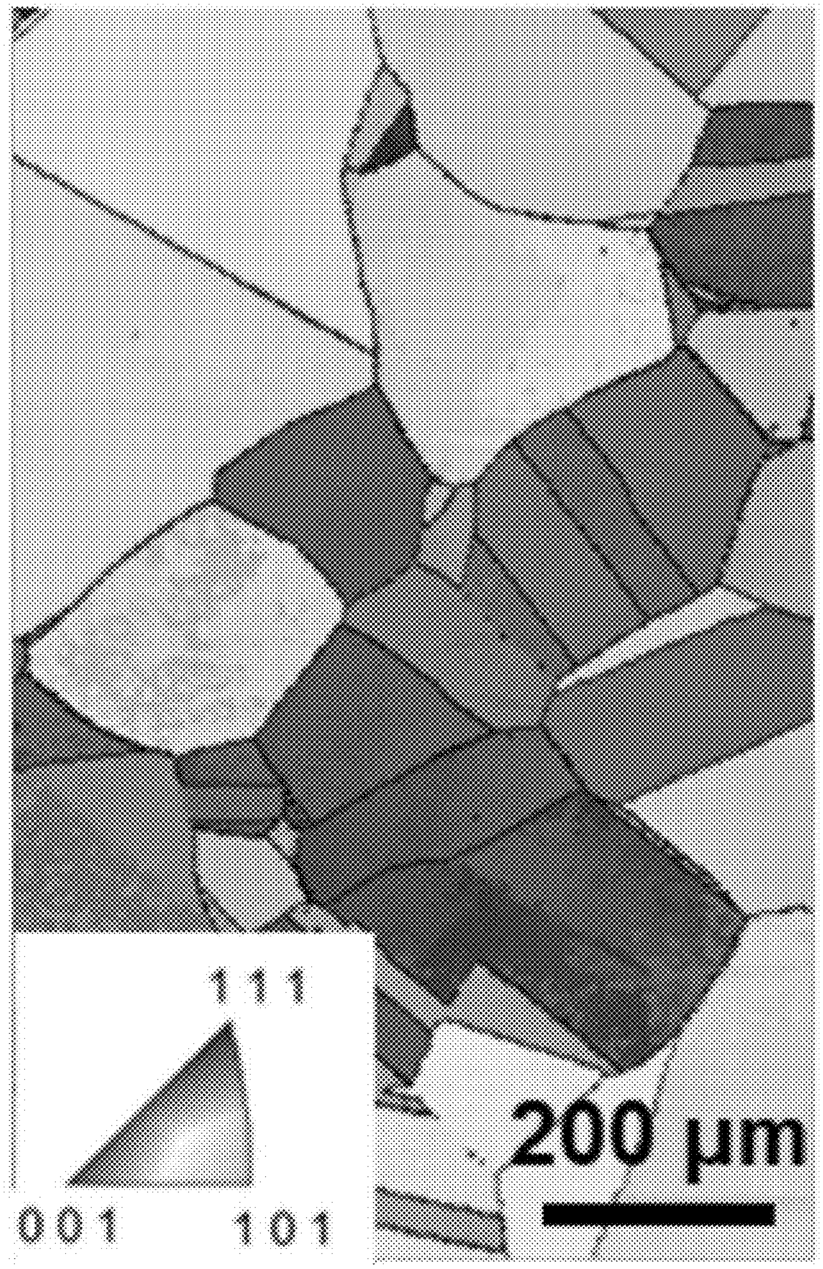
FIG. 3 is the electron back scatter diffraction (EBSD) inverse pole figures (IPF) of the multi-component soft magnetic alloy obtained according to embodiment 1 of the present invention.

The EBSD inverse pole figure (IPF) of the obtained multi-component soft magnetic alloy is shown in FIG. 3, indicating random grain orientation distribution with grain sizes of approximately 200 μm.

Figure 4:
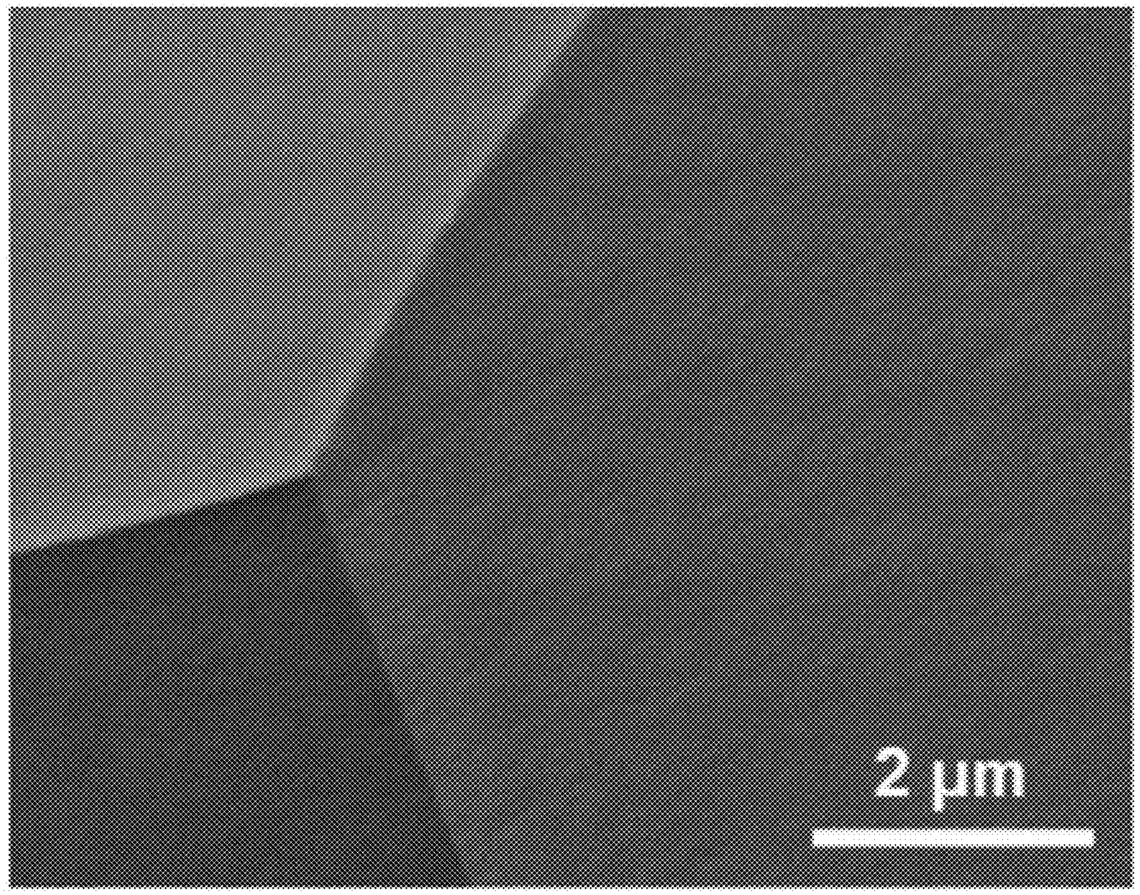
FIG. 4 depicts the high-magnification SEM image of the multi-component soft magnetic alloy obtained according to embodiment of the present invention.

The high-magnification SEM image of the obtained multi-component soft magnetic alloy is shown in FIG. 4, indicating no obvious micrometer-scale precipitates at grain boundaries and within grains.

Figure 5:
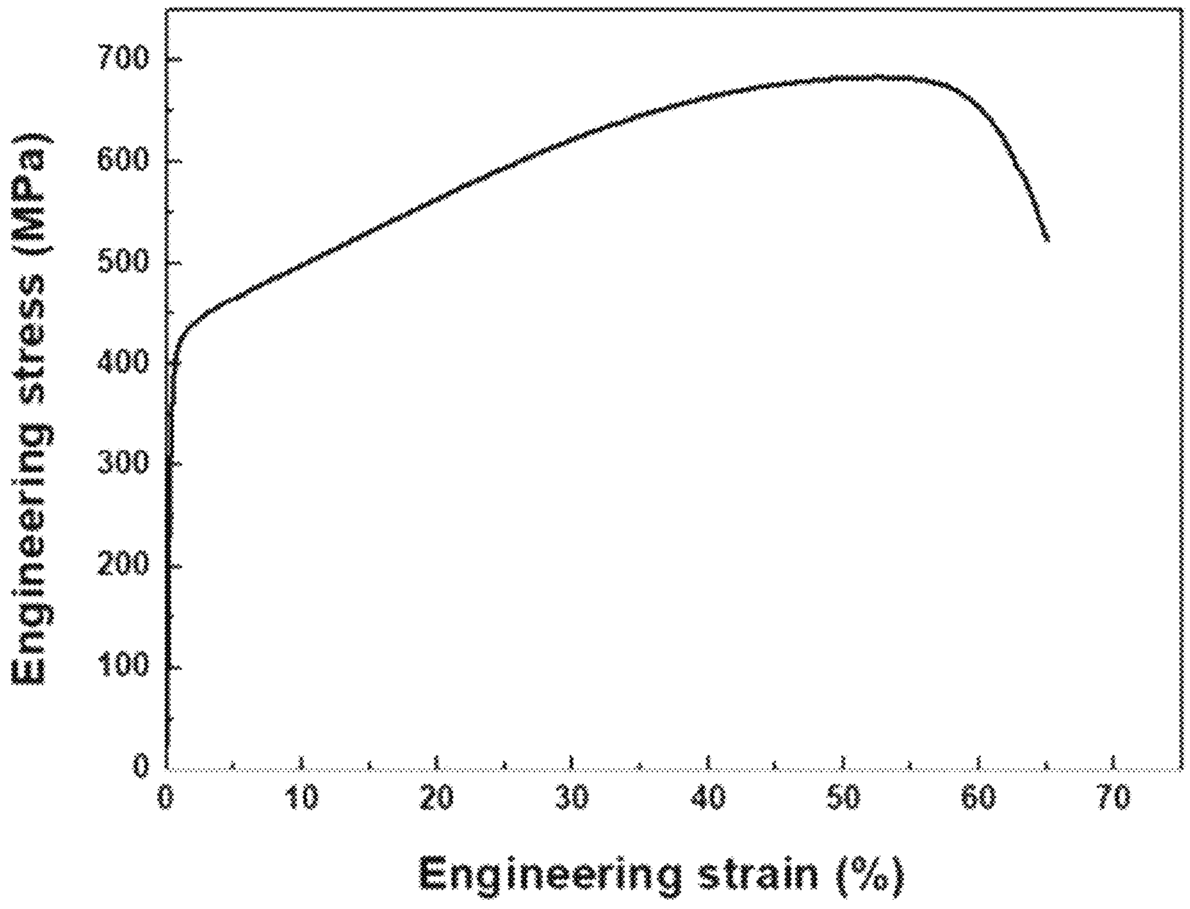
FIG. 5 depicts the tensile curve of the multi-component soft magnetic alloy obtained according to embodiment 1 of the present invention.

The tensile curve of the obtained multi-component soft magnetic alloy is shown in FIG. 5, with a yield strength of approximately 425 MPa, a tensile strength of approximately 679 MPa, and fracture elongation of approximately 65%.

Figure 6:
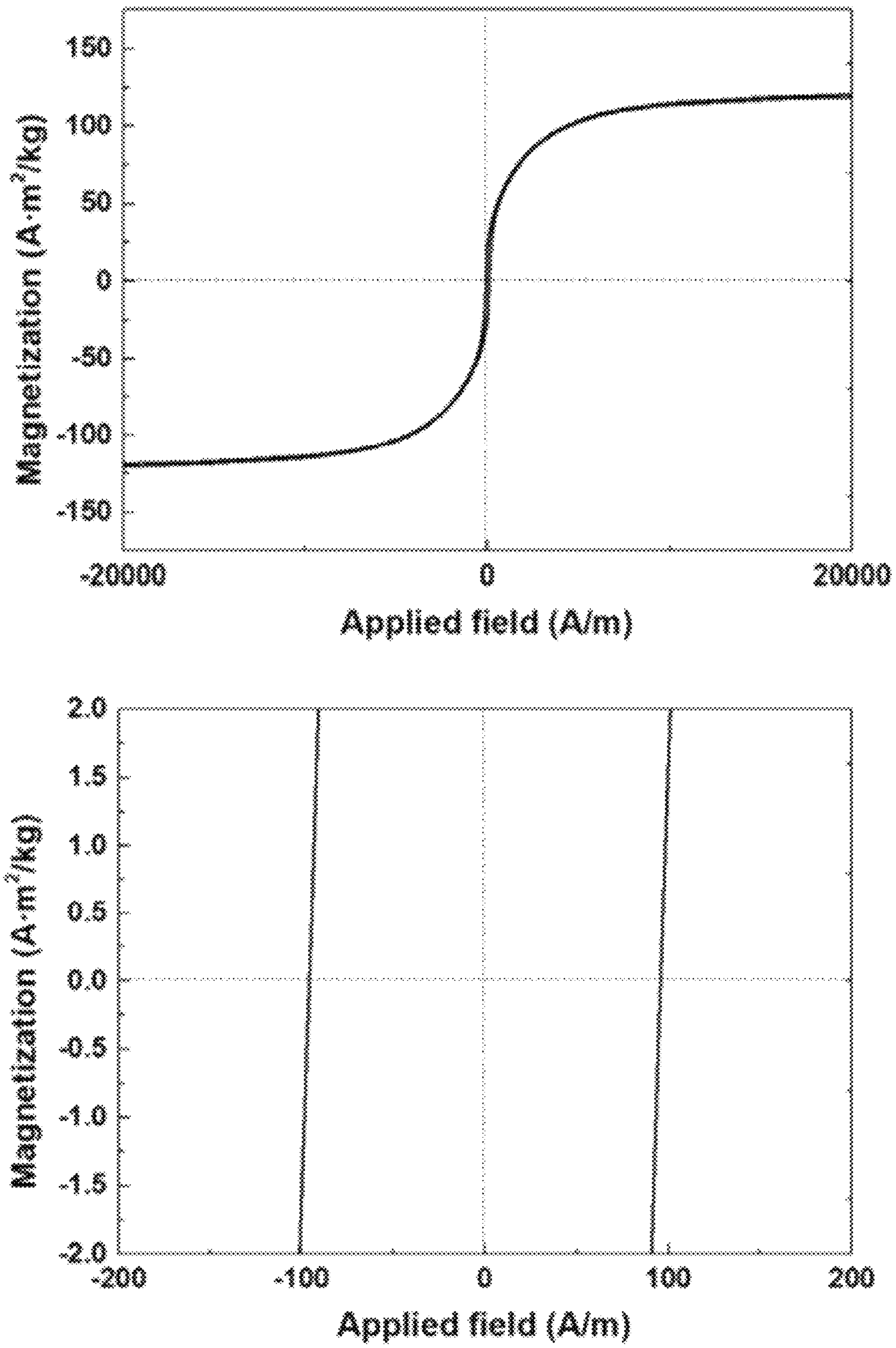
FIG. 6 depicts the hysteresis loop of the multi-component soft magnetic alloy obtained according to embodiment 1 of the present invention.

The hysteresis loop of the obtained multi-component soft magnetic alloy is shown in FIG. 6, with a saturation magnetization of approximately 120.7 $A\cdot m^2/kg$ and coercivity of approximately 94.2 A/m.

Embodiment 2

According to the chemical formula $Fe_{35.6}Co_{26.7}Ni_{26.7}Al_7Ti_{2.5}Ta_{1.5}$ (atomic percentages), the ingredients are prepared using pure metal blocks. They are then subjected to suspension melting, conducted under an inert gas protective atmosphere, with the process repeated four times. During melting, the vacuum is reduced to 0.001 Pa before argon is injected to achieve a slight positive pressure. The melt is maintained at 1873 K for 5 minutes and is then cast into a rectangular shape to obtain an ingot.

The obtained ingot undergoes multiple hot rolling processes. The hot rolling temperature is 1473 K, with a single pass thickness reduction of 10% and a total thickness reduction of 50%.

The hot-rolled alloy blocks are subjected to high-temperature homogenization treatment under an argon protective atmosphere (argon pressure of 10 Pa). The temperature is set at 1423 K, and the homogenization treatment is for 30 minutes before quenching with water. The homogenized alloy is then cut to obtain the multi-component soft magnetic alloy of Embodiment 2.

Figure 7:
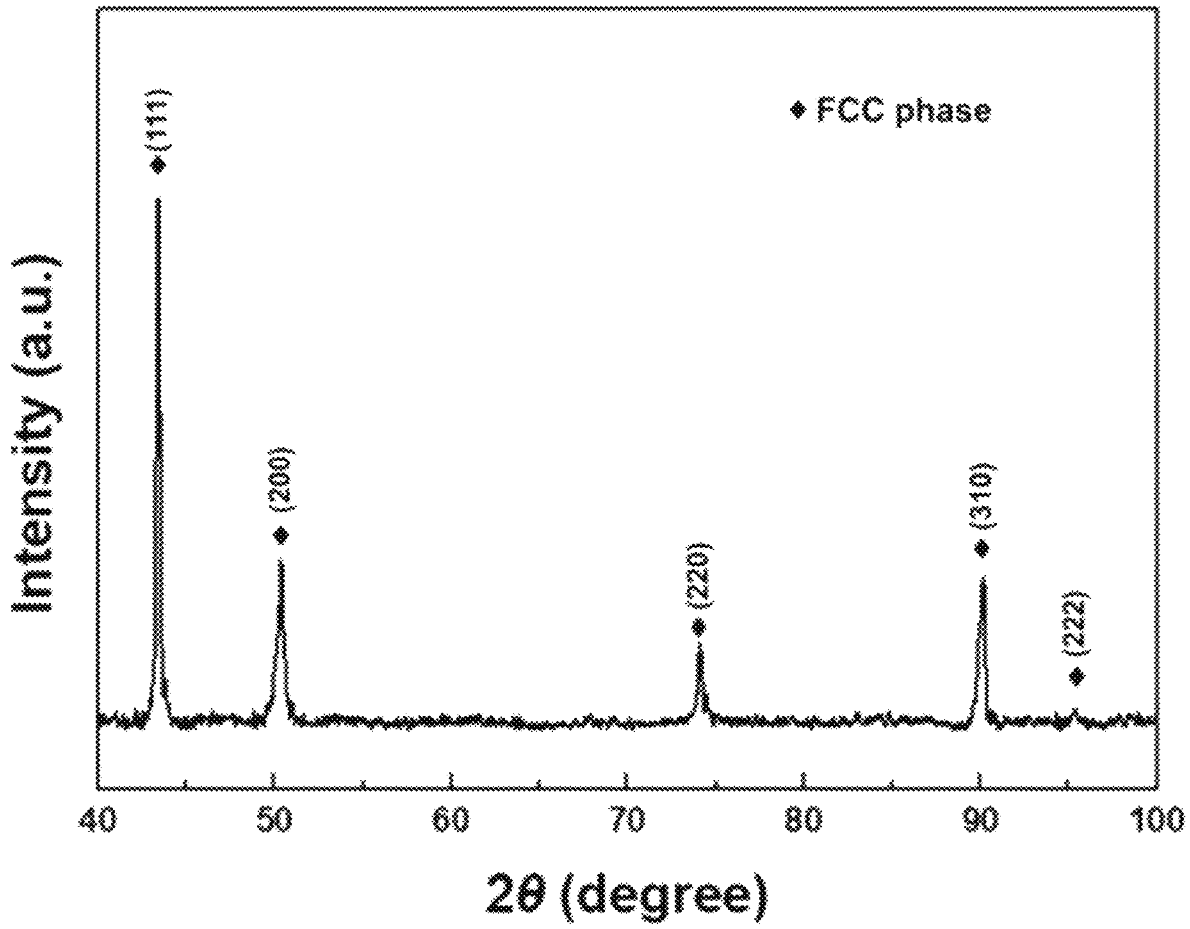
FIG. 7 presents the XRD spectrum of the multi-component soft magnetic alloy obtained according to embodiment 2 of the present invention.

The XRD spectrum of the obtained multi-component soft magnetic alloy is shown in FIG. 7, indicating that the alloy primarily exhibits a face-centered cubic (FCC) solid solution structure.

Figure 8:
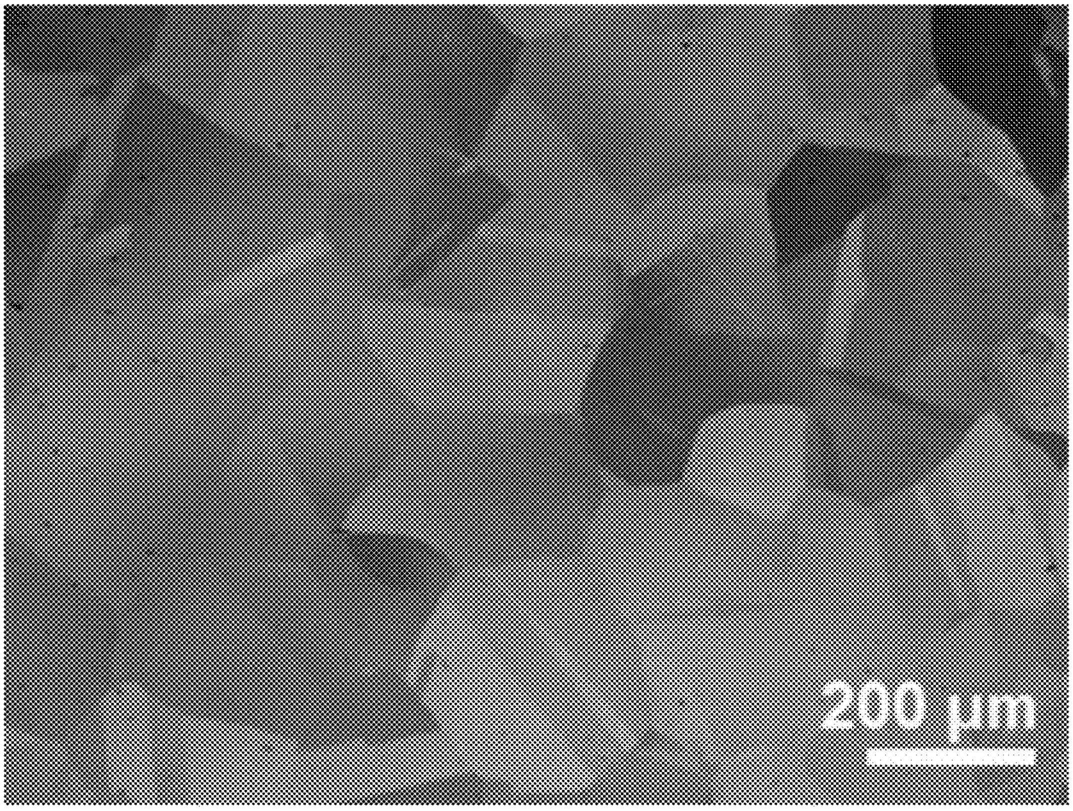
FIG. 8 depicts the SEM image of the microstructure of the multi-component soft magnetic alloy obtained according to embodiment 2 of the present invention.

The SEM image of the obtained multi-component soft magnetic alloy microstructure is shown in FIG. 8, revealing that the alloy obtained in Embodiment 2 is equiaxed grains with numerous annealing twins.

Figure 9:
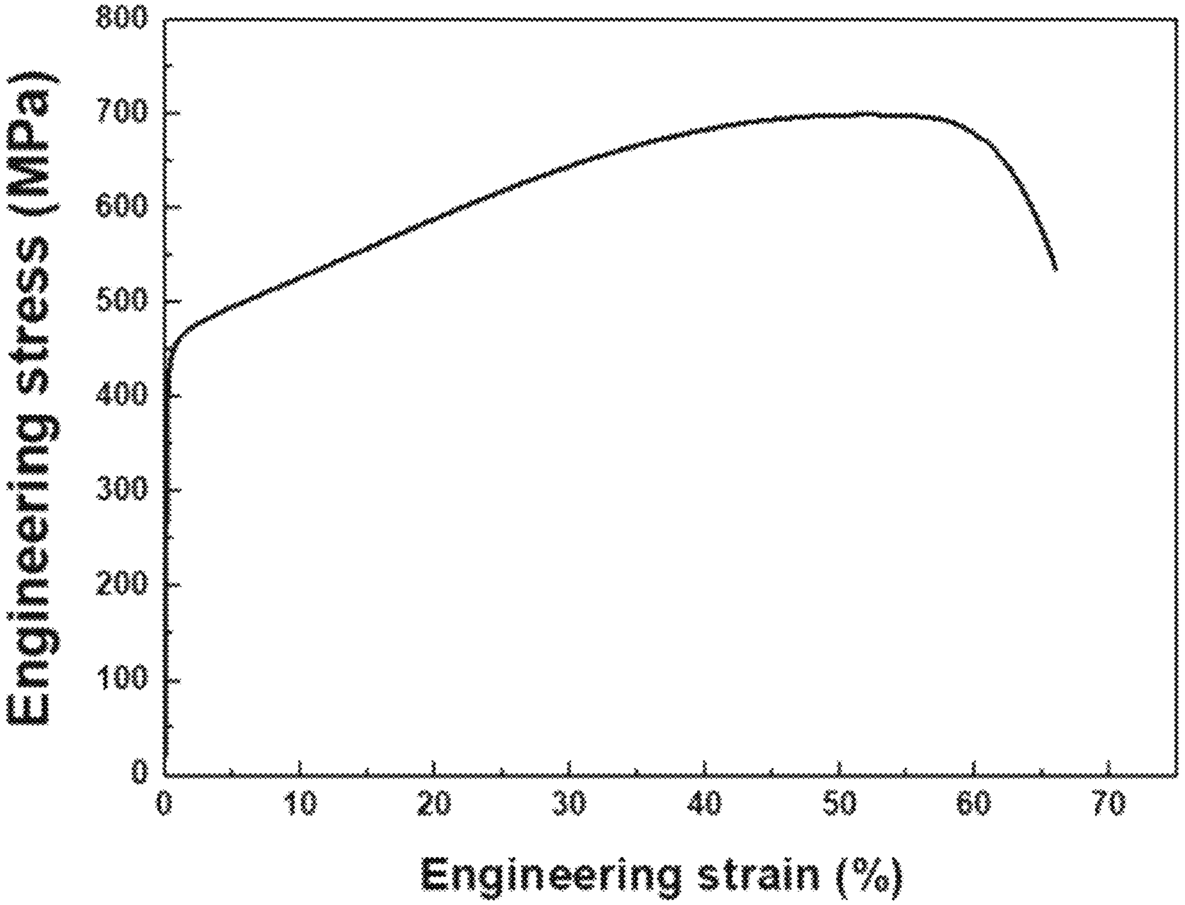
FIG. 9 illustrates the tensile curve of the multi-component soft magnetic alloy obtained according to embodiment 2 of the present invention.

The tensile curve of the obtained multi-component soft magnetic alloy is shown in FIG. 9, indicating that the yield strength of the alloy obtained in Embodiment 2 is approximately 460 MPa, with a tensile strength of approximately 700 MPa and a fracture elongation of approximately 65%.

Figure 10:
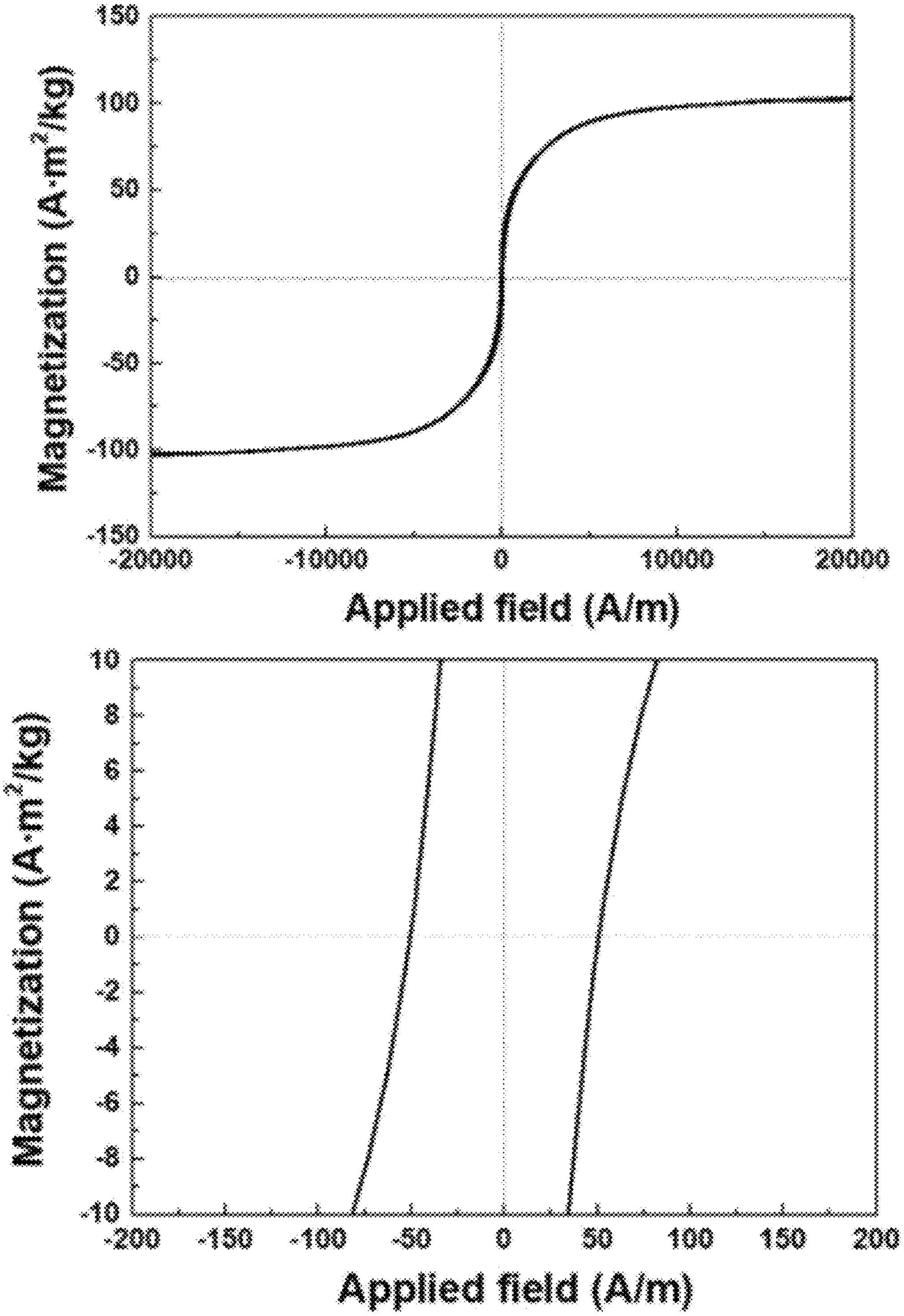
FIG. 10 displays the hysteresis loop of the multi-component soft magnetic alloy obtained according to embodiment 2 of the present invention.

The hysteresis loop of the obtained multi-component soft magnetic alloy is shown in FIG. 10, indicating that the alloy obtained in Embodiment 2 has a saturation magnetization of approximately 102.9 $A\cdot m^2/kg$ and coercivity of 53.5 A/m.

Embodiment 3

According to the chemical formula $Fe_{35.2}Co_{26.4}Ni_{26.4}Al_7Ti_{1.5}Ta_{1.5}Mo_{1.5}Nb_{0.5}$ (atomic percentages), the ingredients are prepared using pure metal blocks. They are then subjected to vacuum arc melting, conducted under an inert gas protective atmosphere, with the process repeated four times. During melting, the vacuum is reduced to 0.001 Pa before argon is injected to achieve a slight positive pressure. The melting temperature is 1873 K.

After obtaining the alloy ingot, the alloy undergoes multiple hot rolling processes. The hot rolling temperature is 1473 K, with a single pass thickness reduction of 10% and a total thickness reduction of 50%.

The hot-rolled alloy blocks are subjected to high-temperature homogenization treatment under an argon protective atmosphere (argon pressure of 10 Pa). The temperature is set at 1423 K, and the homogenization treatment is for 30 minutes before quenching with water. The homogenized block material is then sliced to obtain the multi-component soft magnetic alloy of Embodiment 3.

Figure 11:
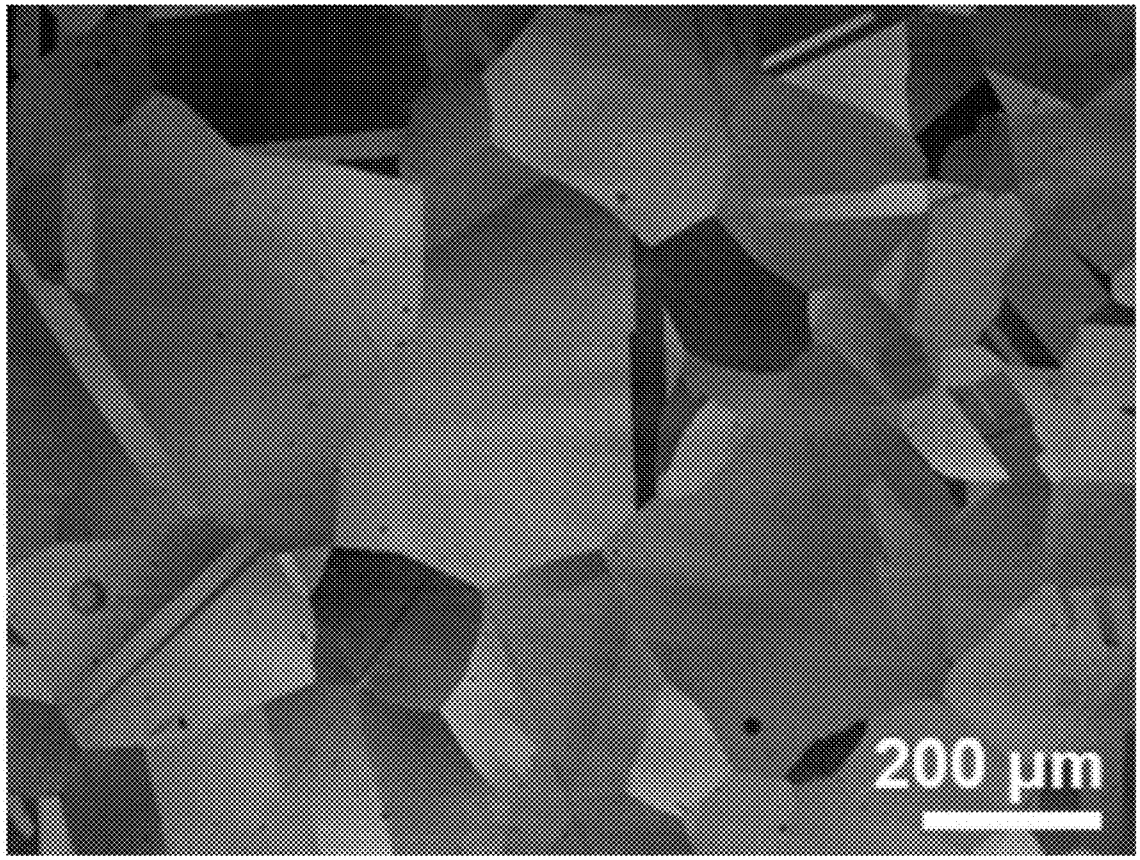
FIG. 11 depicts the SEM image of the microstructure of the multi-component soft magnetic alloy obtained according to embodiment 3 of the present invention.

The SEM image of the obtained multi-component soft magnetic alloy microstructure is shown in FIG. 11, revealing that the alloy obtained in Embodiment 3 consists of equiaxed grains with numerous annealing twins.

Figure 12:
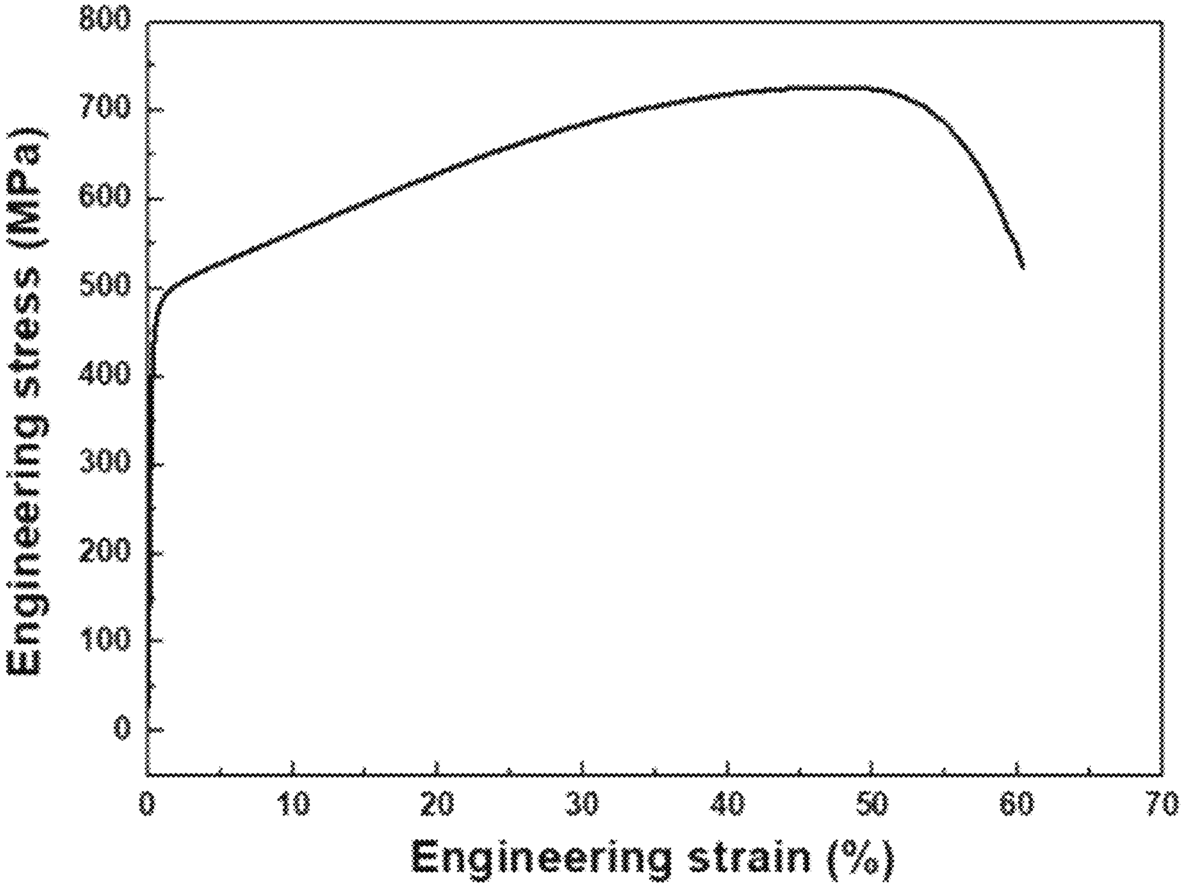
FIG. 12 illustrates the tensile curve of the multi-component soft magnetic alloy obtained according to embodiment 3 of the present invention.

The tensile curve of the obtained multi-component soft magnetic alloy is shown in FIG. 12, indicating that the yield strength of the alloy obtained in Embodiment 3 is approximately 480 MPa, with a tensile strength of approximately 720 MPa and a fracture elongation of approximately 60%.

Embodiment 4

According to the chemical formula $Fe_{36.4}Co_{27.3}Ni_{27.3}Al_5Ti_{2.5}Ta_{1.5}$ (atomic percentages), the ingredients are prepared using pure metal blocks. They are then subjected to suspension melting, conducted under an inert gas protective atmosphere, with the process repeated four times. During melting, the vacuum is reduced to 0.001 Pa before argon is injected to achieve a slight positive pressure. The melt is maintained at 1873 K for 5 minutes and is cast into a rectangular shape to obtain an ingot.

The obtained ingot undergoes multiple hot rolling processes. The hot rolling temperature is 1473 K, with a single pass thickness reduction of 10% and a total thickness reduction of 50%.

The hot-rolled alloy blocks are subjected to high-temperature homogenization treatment under an argon protective atmosphere (argon pressure of 10 Pa). The temperature is set at 1423 K, and the homogenization treatment is for 30 minutes before quenching with water. The homogenized alloy is then cut and treated at 1073 K for 5 hours to obtain the multi-component soft magnetic alloy of Embodiment 4.

Figure 13:
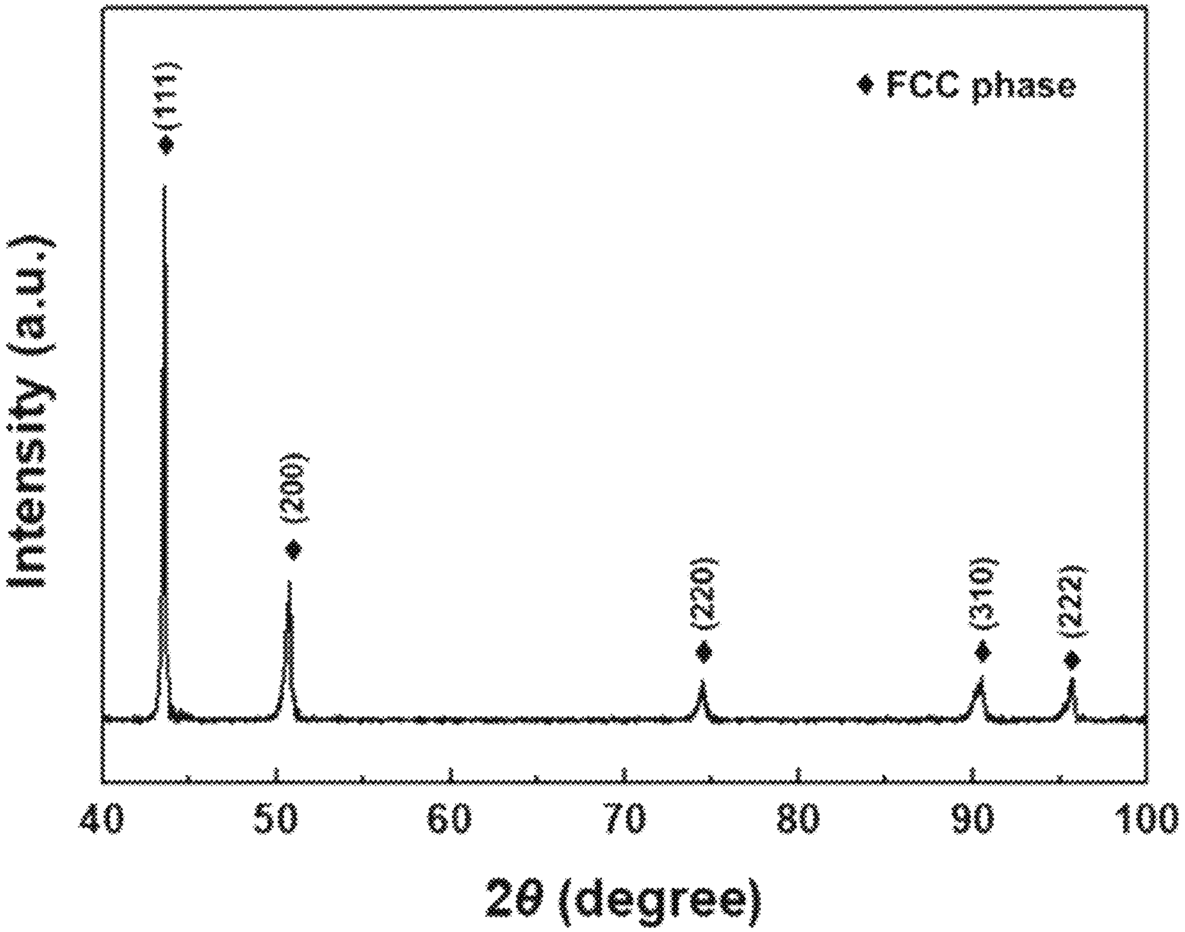
FIG. 13 shows the XRD spectrum of the multi-component soft magnetic alloy obtained according to embodiment 4 of the present invention.

The XRD spectrum of the obtained multi-component soft magnetic alloy is shown in FIG. 13, indicating that the alloy obtained in Embodiment 4 primarily exhibits a face-centered cubic (FCC) solid solution structure.

Figure 14:
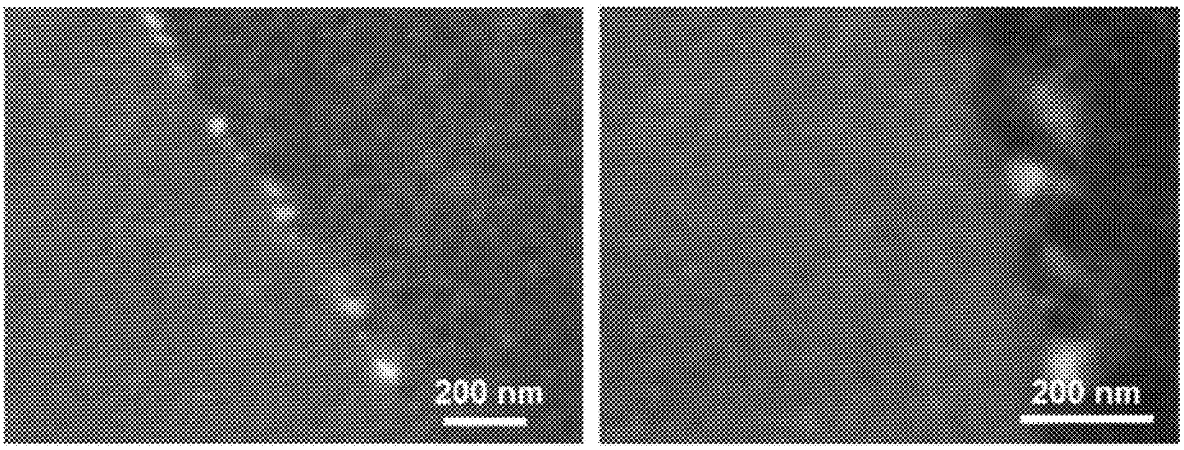
FIG. 14 displays the high-magnification SEM image of the multi-component soft magnetic alloy obtained according to embodiment 4 of the present invention.

The high-magnification SEM image of the obtained multi-component soft magnetic alloy is shown in FIG. 14, revealing the presence of nano-precipitates in the alloy obtained in Embodiment 4, with an average size of approximately 23.3 nm.

Figure 15:
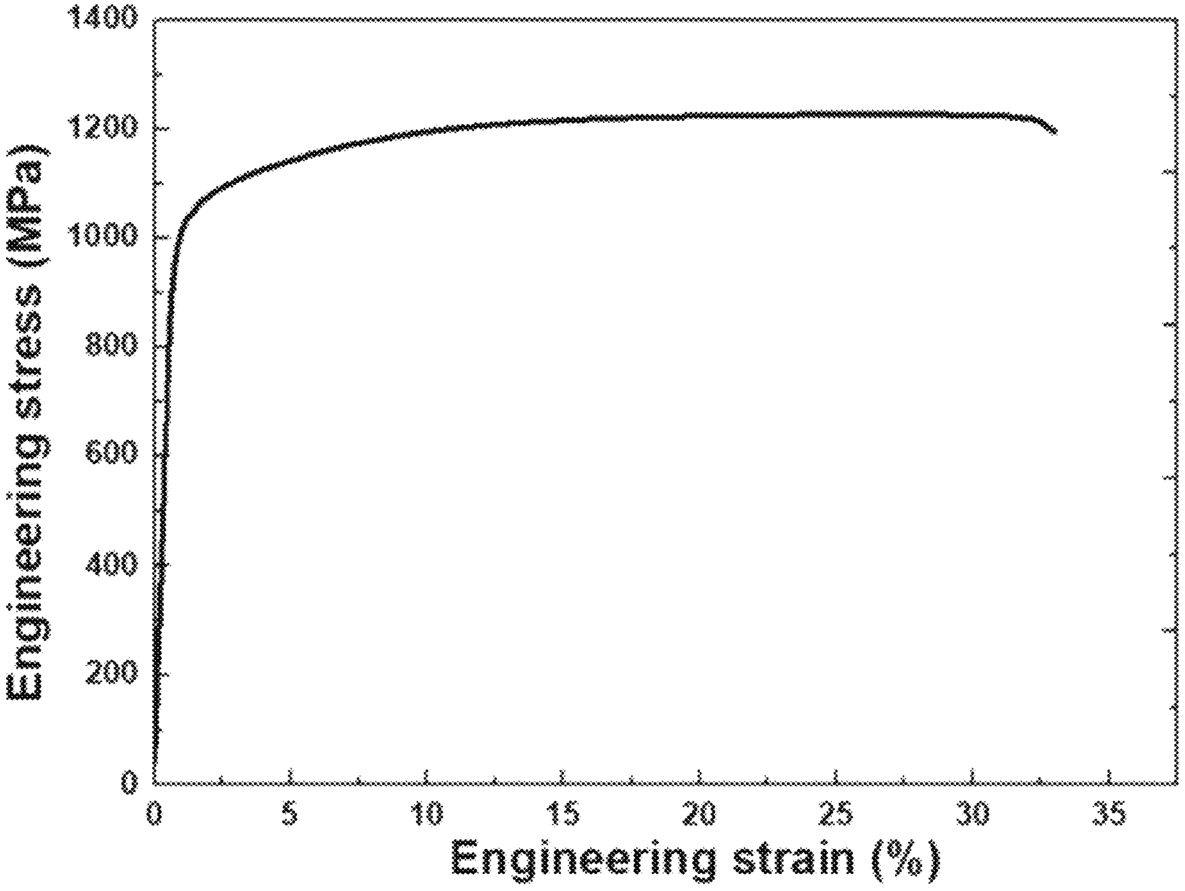
FIG. 15 represents the tensile curve of the multi-component soft magnetic alloy obtained according to embodiment 4 of the present invention.

The tensile curve of the obtained multi-component soft magnetic alloy is shown in FIG. 15, indicating that the yield strength of the alloy obtained in Embodiment 4 is approximately 1009 MPa, with a tensile strength of approximately 1216 MPa and a fracture elongation of approximately 33%.

Figure 16:
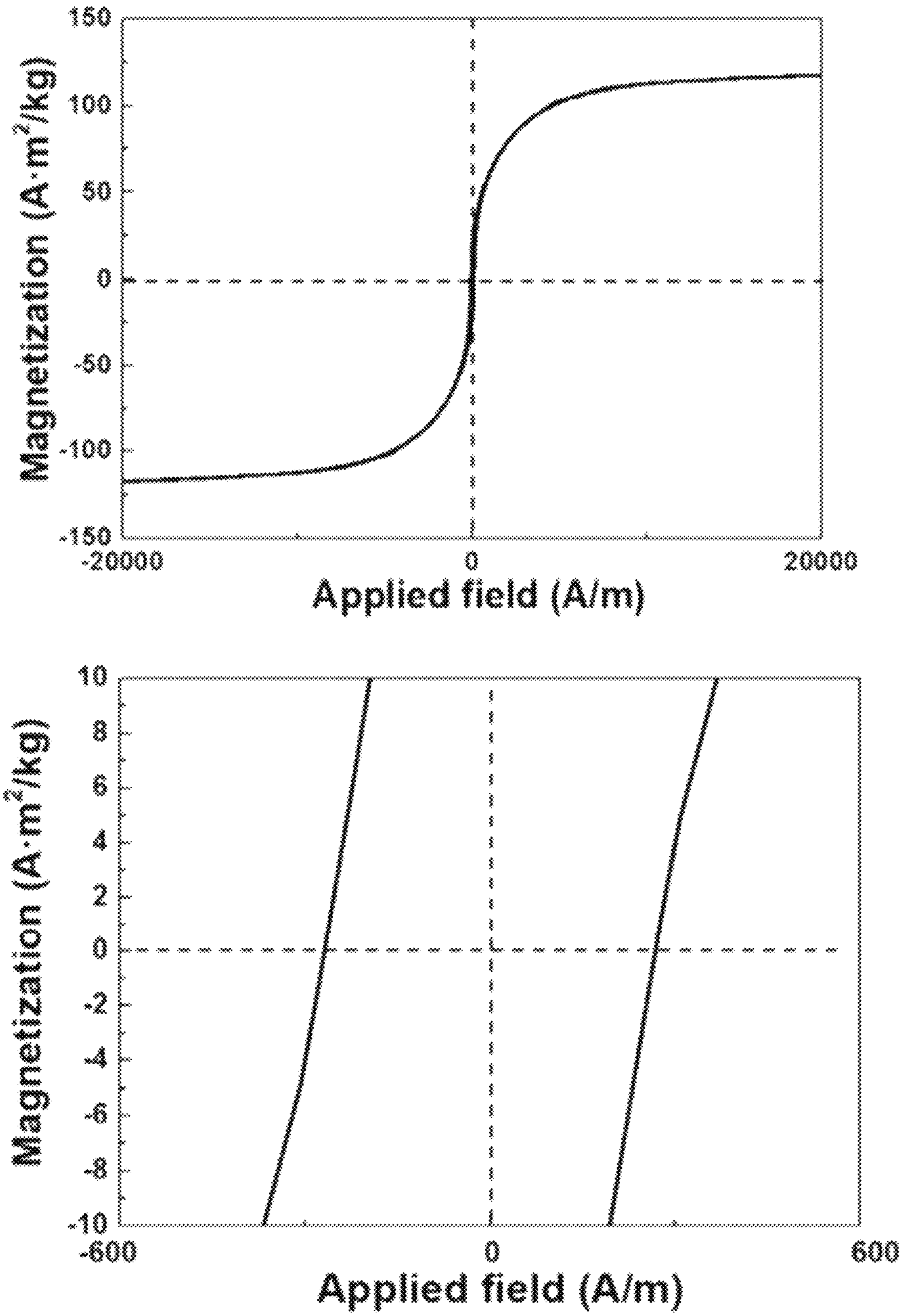
FIG. 16 exhibits the hysteresis loop of the multi-component soft magnetic alloy obtained according to embodiment 4 of the present invention.

The magnetic hysteresis loop of the obtained multi-component soft magnetic alloy is shown in FIG. 16, indicating that the alloy obtained in Embodiment 4 has a saturation magnetization of 117.3 A·m$^2$/kg and a coercivity of 270.5 A/m.

Embodiment 5

According to the chemical formula $Fe_{36.4}Co_{27.3}Ni_{27.3}Al_5Ti_{2.5}Ta_{1.5}$ (atomic percentages), the ingredients are prepared using pure metal blocks. They are then subjected to suspension melting, conducted under an inert gas protective atmosphere, with the process repeated four times. During melting, the vacuum is reduced to 0.001 Pa before argon is injected to achieve a slight positive pressure. The melt is maintained at 1873 K for 5 minutes and is subsequently cast into a rectangular shape to obtain an ingot.

The obtained alloy undergoes multiple hot rolling processes. The hot rolling temperature is 1473 K, with a single pass thickness reduction of 10% and a total thickness reduction of 50%.

The hot-rolled alloy blocks are subjected to high-temperature homogenization treatment under an argon protective atmosphere (argon pressure of 10 Pa). The temperature is set at 1423 K, and the homogenization treatment is for 30 minutes before quenching with water. The homogenized alloy is then cut and treated at 1123 K for 5 hours to obtain the multi-component soft magnetic alloy of Embodiment 5.

Figure 17:
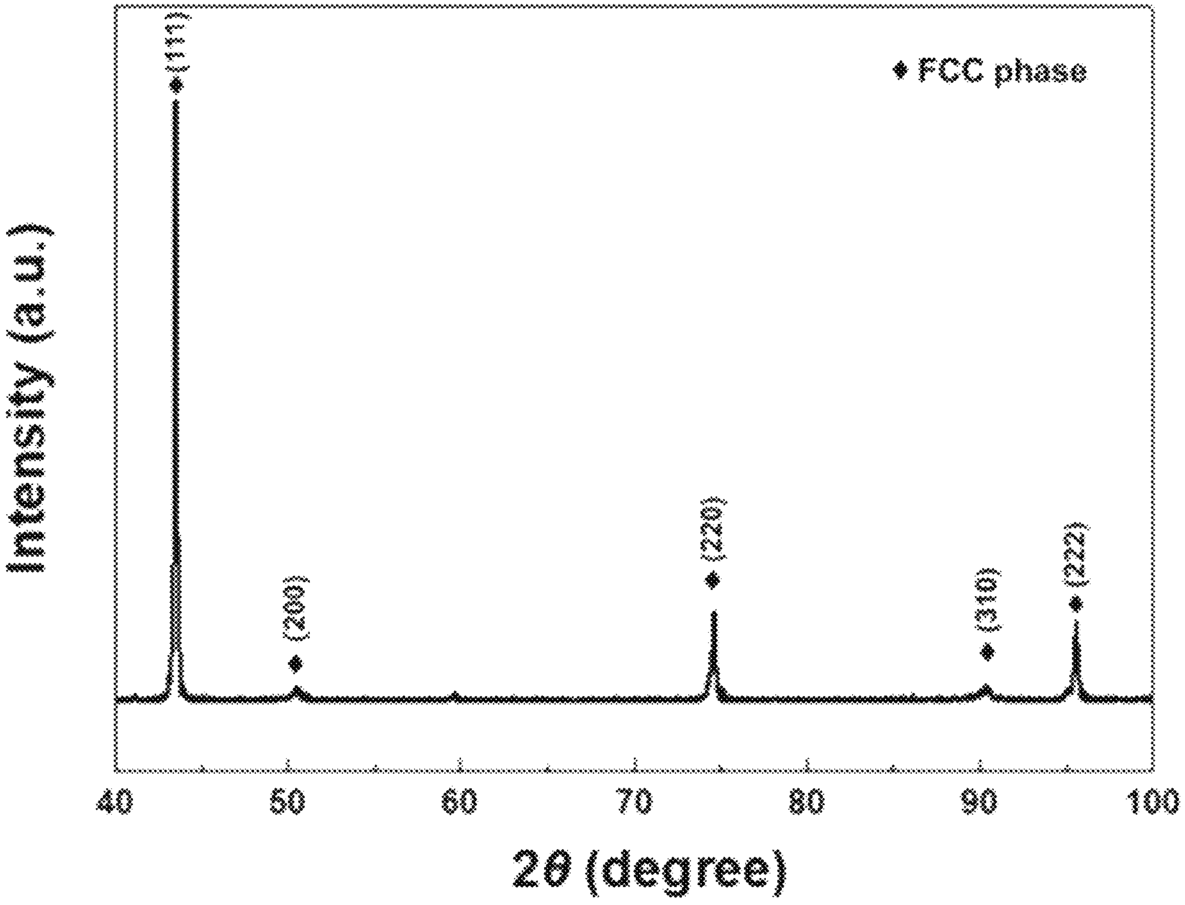
FIG. 17 presents the XRD spectrum of the multi-component soft magnetic alloy obtained according to embodiment 5 of the present invention.

The XRD spectrum of the obtained multi-component soft magnetic alloy is shown in FIG. 17, indicating that the alloy obtained in Embodiment 5 primarily exhibits a face-centered cubic (FCC) solid solution structure.

Figure 18:
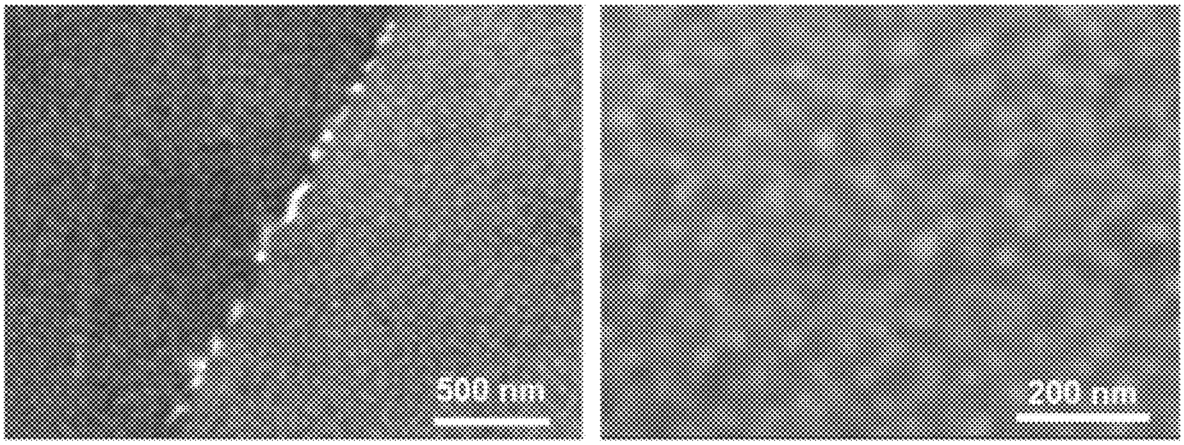
FIG. 18 depicts the high-magnification SEM image of the multi-component soft magnetic alloy obtained according to embodiment 5 of the present invention.

The high-magnification SEM image of the obtained multi-component soft magnetic alloy is shown in FIG. 18, revealing the presence of nano-precipitates in the alloy obtained in Embodiment 5, with an average size of approximately 50.4 nm.

Figure 19:
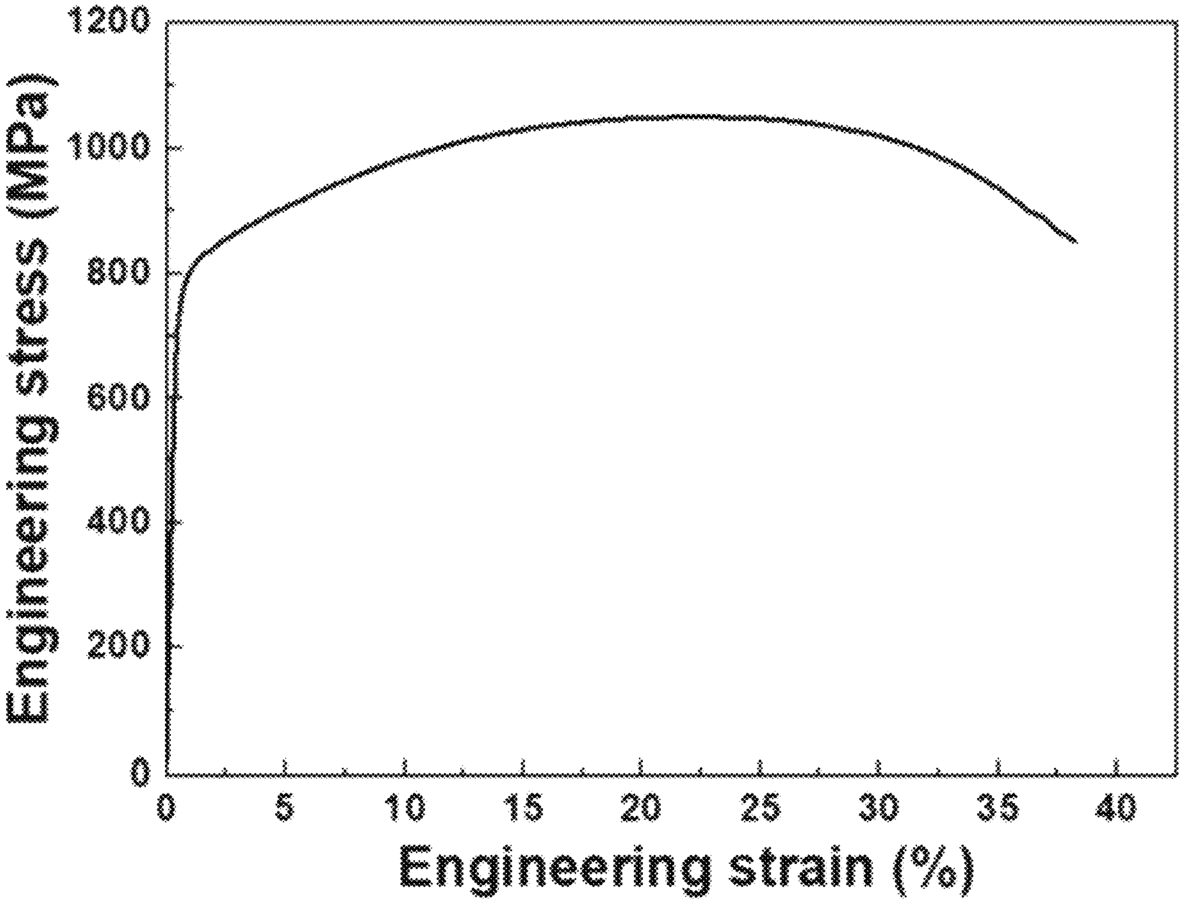
FIG. 19 illustrates the tensile curve of the multi-component soft magnetic alloy obtained according to embodiment 5 of the present invention.

The tensile curve of the obtained multi-component soft magnetic alloy is shown in FIG. 19, indicating that the yield strength of the alloy obtained in Embodiment 5 is approximately 804 MPa, with a tensile strength of approximately 1016 MPa and a fracture elongation of approximately 37%.

Figure 20:
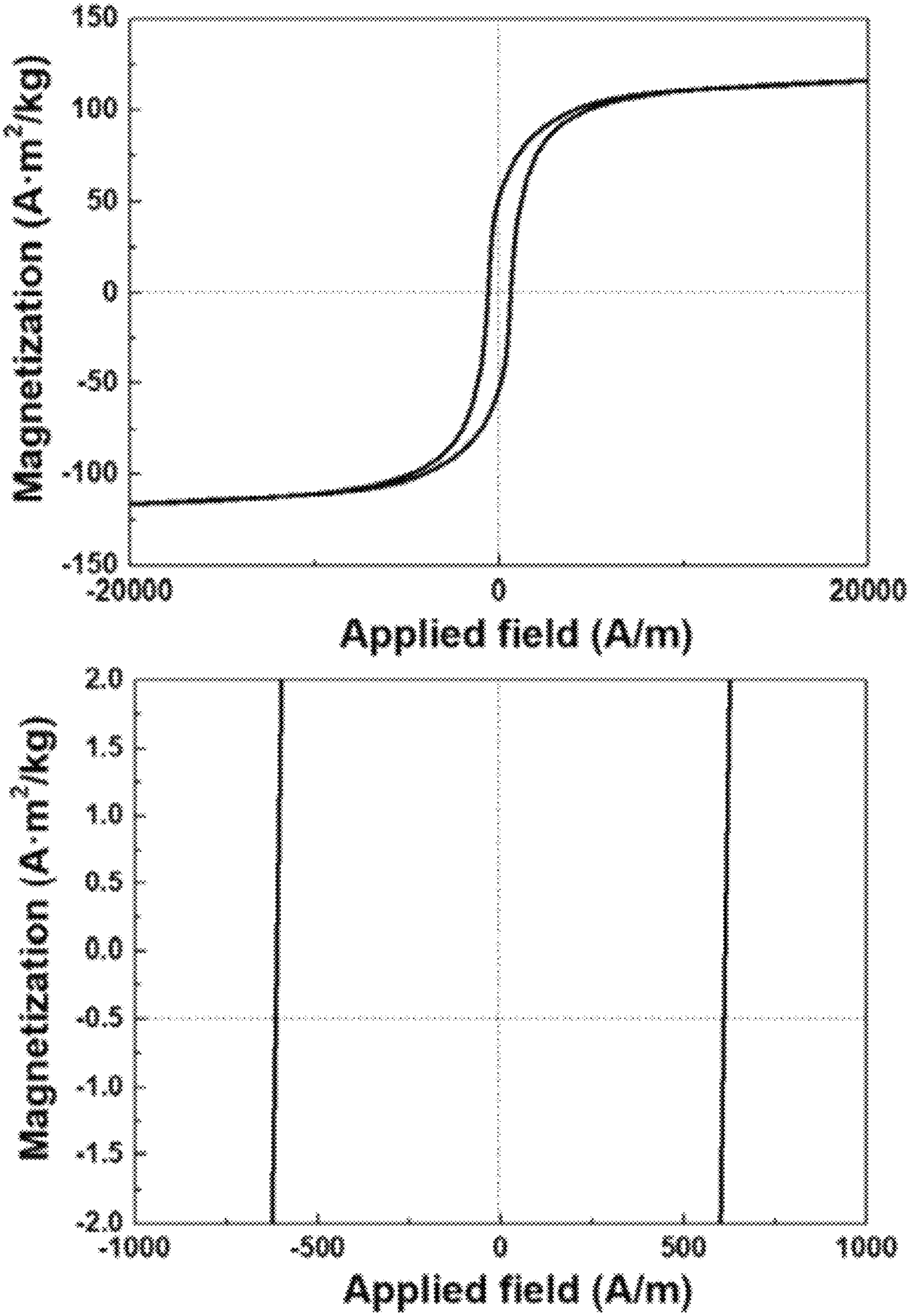
FIG. 20 displays the hysteresis loop of the multi-component soft magnetic alloy obtained according to embodiment 5 of the present invention.

The magnetic hysteresis loop of the obtained multi-component soft magnetic alloy is shown in FIG. 20, indicating that the alloy obtained in Embodiment 5 has a saturation magnetization of approximately 116.7 A·m$^2$/kg and a coercivity of approximately 610.2 A/m.

Embodiment 6

According to the chemical formula $Fe_{35.6}Co_{26.7}Ni_{26.7}Al_7Ti_{2.5}Ta_{1.5}$ (atomic percentages), the ingredients are prepared using pure metal blocks. They are then subjected to vacuum arc melting, conducted under an inert gas protective atmosphere, with the process repeated four times. During the melting, the vacuum is reduced to 0.001 Pa before argon is injected to achieve a slight positive pressure. The melting temperature is 1873 K.

After obtaining the alloy ingot, the alloy undergoes multiple hot rolling processes. The hot rolling temperature is 1473 K, with a single pass thickness reduction of 10% and a total thickness reduction of 50%.

The hot-rolled alloy is subjected to high-temperature homogenization treatment under an argon protective atmosphere (argon pressure of 10 Pa). The temperature is set at 1423 K, and the homogenization treatment is for 2 hours before quenching with water. The homogenized block material is then cut and treated at 1023 K for 5 hours to obtain the multi-component soft magnetic alloy of Embodiment 6.

Figure 21:
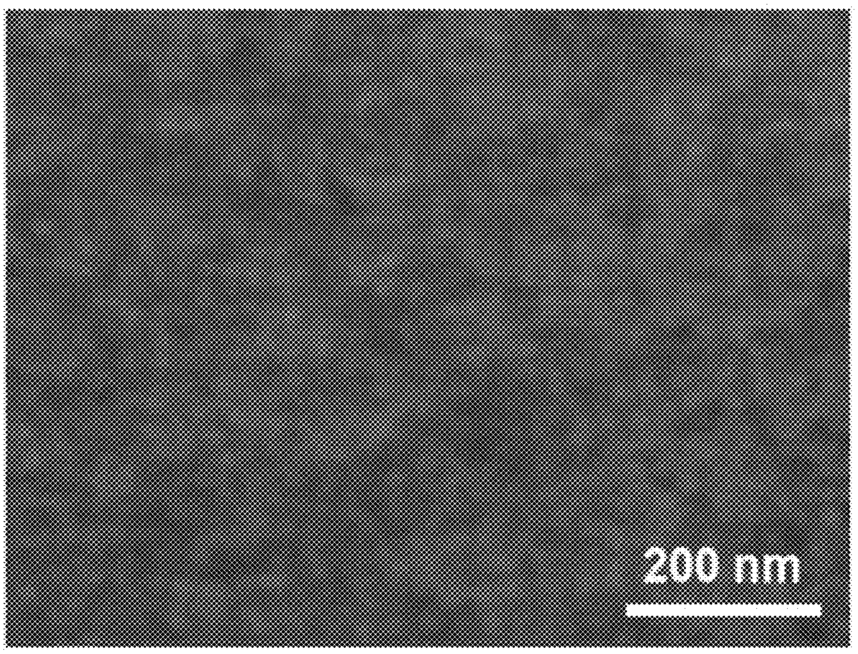
FIG. 21 shows the high-magnification SEM image of the multi-component soft magnetic alloy obtained according to embodiment 6 of the present invention.

The high-magnification SEM image of the obtained multi-component soft magnetic alloy is shown in FIG. 21, indicating the presence of nano-precipitates in the multi-component alloy, with nano-precipitates inside the grains measuring less than 20 nm.

Figure 22:
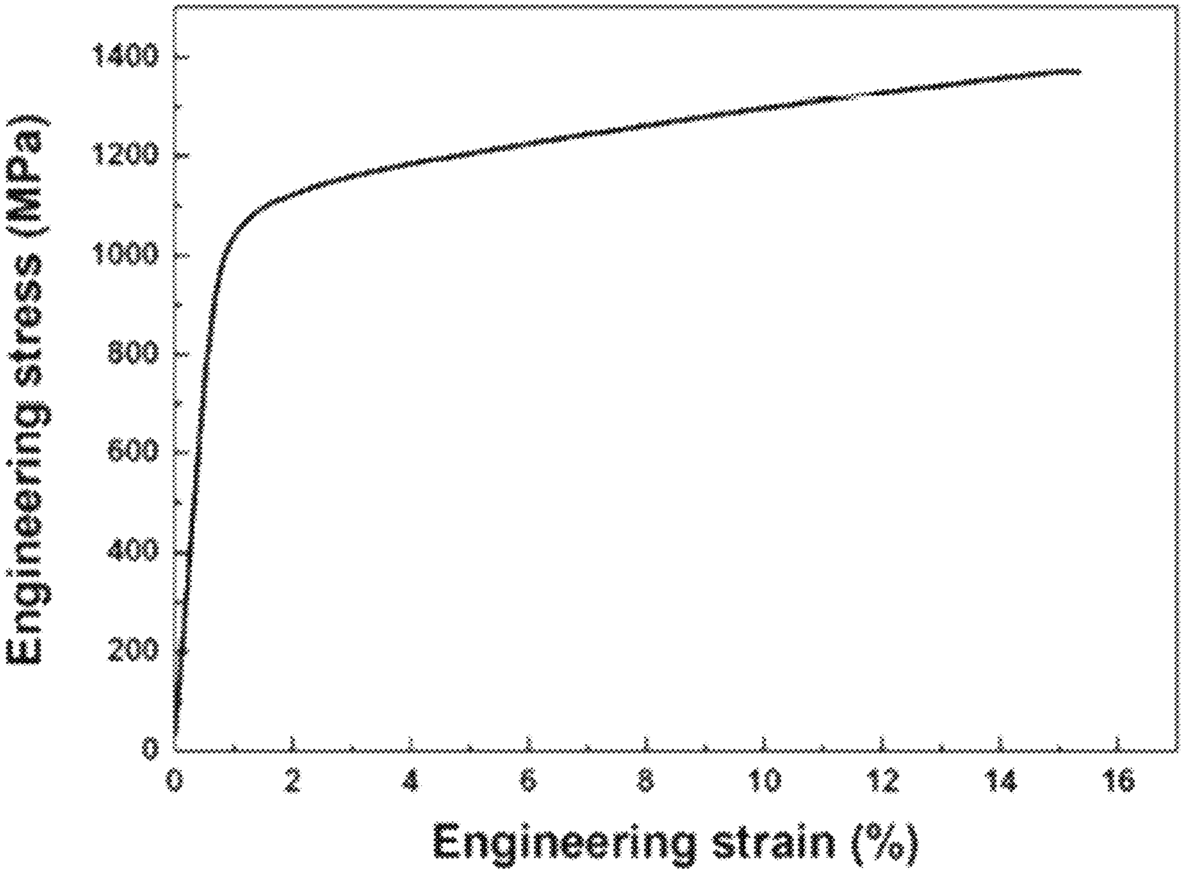
FIG. 22 represents the tensile curve of the multi-component soft magnetic alloy obtained according to embodiment 6 of the present invention.

The tensile curve of the obtained multi-component soft magnetic alloy is shown in FIG. 22, indicating that the yield strength of the alloy obtained in Embodiment 6 is approximately 1061 MPa, with a tensile strength of approximately 1364 MPa and a fracture elongation of approximately 15%.

Embodiment 7

According to the chemical composition $Fe_{35.6}Co_{26.7}Ni_{26.7}Al_7Ti_{2.5}Ta_{1.5}$ (atomic percentages), the raw materials are prepared using pure metal blocks. They are then subjected to vacuum arc melting, conducted under an inert gas protective atmosphere, with the process repeated four times. During the melting, the vacuum is reduced to 0.001 Pa before argon is injected to achieve a slight positive pressure. The melting temperature is 1873 K.

After obtaining the alloy ingot, the alloy underwent multiple hot rolling processes. The hot rolling temperature is 1473 K, with a single pass thickness reduction of 10% and a total thickness reduction of 50%.

The hot-rolled alloys are subjected to high-temperature homogenization treatment under an argon protective atmosphere (argon pressure of 10 Pa). The temperature is set at 1423 K, and the homogenization treatment is for 2 hours before quenching with water. The homogenized alloy is then cut and treated at 1123 K for 5 hours to obtain the multi-component soft magnetic alloy of Embodiment 7.

Figure 23:
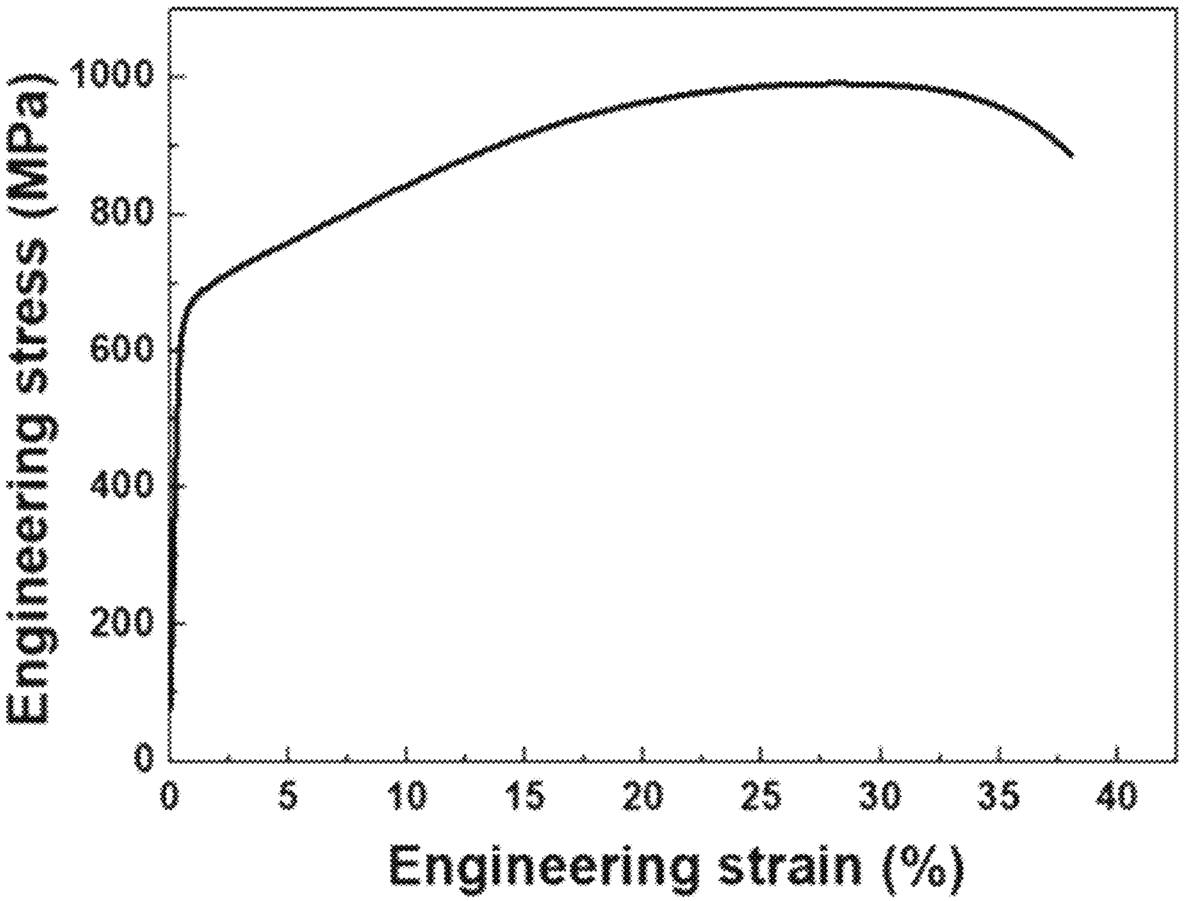
FIG. 23 illustrates the tensile curve of the multi-component soft magnetic alloy obtained according to embodiment 7 of the present invention.

The tensile curve of the obtained multi-component soft magnetic alloy is shown in FIG. 23, indicating that the yield strength of the alloy obtained in Embodiment 7 is approximately 670 MPa, with a tensile strength of approximately 980 MPa and a fracture elongation of approximately 37%.

Figure 24:
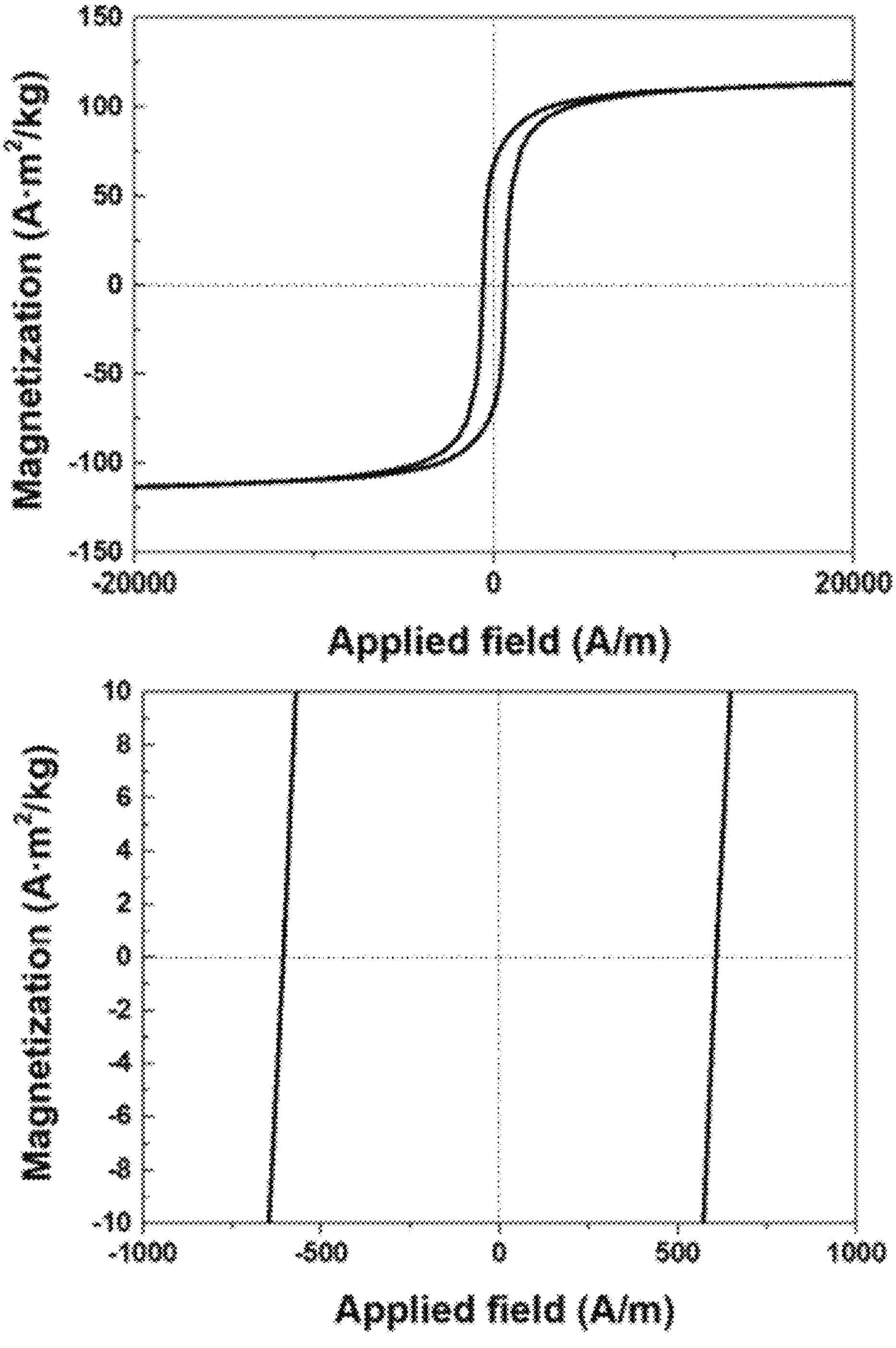
FIG. 24 displays the hysteresis loop of the multi-component soft magnetic alloy obtained according to embodiment 7 of the present invention.

The hysteresis loop of the obtained multi-component soft magnetic alloy is shown in FIG. 24, indicating that the alloy obtained in Embodiment 7 has a saturation magnetization of approximately 113.1 $A \cdot m^2/kg$ and a coercivity of 612.2 A/m.

Comparing Embodiment 1 without aging treatment with Embodiments 4 and 5 with aging treatment, it can be seen that under the same alloy composition, aging treatment can introduce nano-precipitates into the alloy, effectively improving its strength. Meanwhile, the coercivity of the alloy significantly increases after aging treatment. Comparing Embodiments 4 and 5, it can be observed that under the same alloy composition, aging at a slightly higher temperature can also achieve a strong and ductile alloy, but with a greater increase in coercivity. Comparing Embodiments 2 and 3, it can be inferred that under the same processing conditions, increasing the variety of elements forming the $L1_2$ phase is also beneficial for improving the strength and ductility of the alloy. Comparing Embodiments 5 and 7, it can be seen that under the same aging treatment process, appropriately increasing the content of minor alloying elements can improve the strength of the alloy while having little effect on the coercivity. However, the addition of non-magnetic elements will decrease the saturation magnetization of the alloy.

Comparison Embodiment 1

According to the chemical composition $Fe_{34.8}Co_{26.1}Ni_{26.1}Al_3Ti_3Ta_5Nb_2$ (atomic percentages), the raw materials are prepared using pure metal blocks. They are then subjected to vacuum arc melting, conducted under an inert gas protective atmosphere, with the process repeated four times. During the melting, the vacuum is reduced to 0.001 Pa before argon is injected to achieve a slight positive pressure. The melting temperature is 1873 K.

After obtaining the melted alloy ingot, the alloy undergoes multiple hot rolling processes. The hot rolling temperature is 1473 K, with a single pass thickness reduction of 10% and a total thickness reduction of 50%.

The hot-rolled alloy is subjected to high-temperature homogenization treatment under an argon protective atmosphere (argon pressure of 10 Pa). The temperature is set at 1423 K, and the homogenization treatment is for 2 hours before quenching with water. This results in the multi-component soft magnetic alloy for Comparison Embodiment 1.

Figure 25:
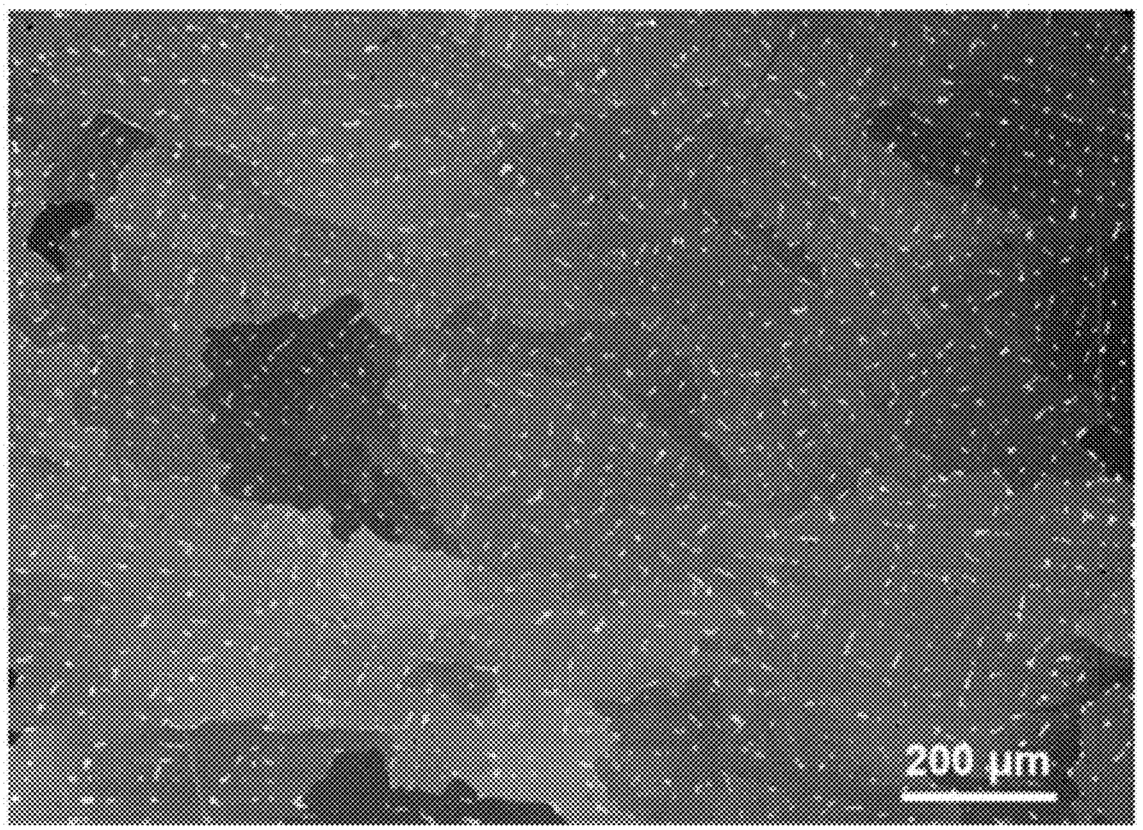
FIG. 25 depicts the SEM image of the microstructure of the multi-component soft magnetic alloy obtained according to the comparison embodiment 1 of the present invention.

The SEM image of the obtained multi-component soft magnetic alloy is shown in FIG. 25. It can be seen that after high-temperature homogenization treatment, the multi-component alloy obtained for Comparison Embodiment 1 fails to form a single face-centered cubic structure. In addition to the face-centered cubic matrix, there also exists micrometer-scale intermetallic phase with enrichment of elements such as Ta and Nb, deteriorating the mechanical and soft magnetic properties of the alloy. Comparing Embodiments 1 to 3 with Comparison Embodiment 1, it is obvious that the content of elements such as Ta and Nb should be reasonably distributed to avoid excessive alloying elements leading to the appearance of micrometer-scale intermetallic phases.

Comparison Embodiment 2

According to the chemical formula $Fe_{35.6}Co_{26.7}Ni_{26.7}Al_7Ti_{2.5}Ta_{1.5}$ (atomic percentages), the raw materials are prepared using pure metal blocks and subjected to vacuum arc melting, with melting carried out under an inert gas atmosphere. The process is repeated four times. After reaching a vacuum level of 0.001 Pa, argon gas is introduced to achieve a slightly positive pressure, and the melting temperature is set at 1873 K.

After obtaining the melted ingot, the alloy undergoes multiple hot rolling passes. The hot rolling temperature is 1473 K, with a single pass thickness reduction of 10% per pass and a total thickness reduction of 50%.

The hot-rolled alloy is subjected to homogenization treatment in a protective atmosphere of argon (at a pressure of 10 Pa) at a temperature of 1523 K for 2 hours, followed by water quenching. This results in the multi-component soft magnetic alloy denoted as Comparison Embodiment 2.

Figure 26:
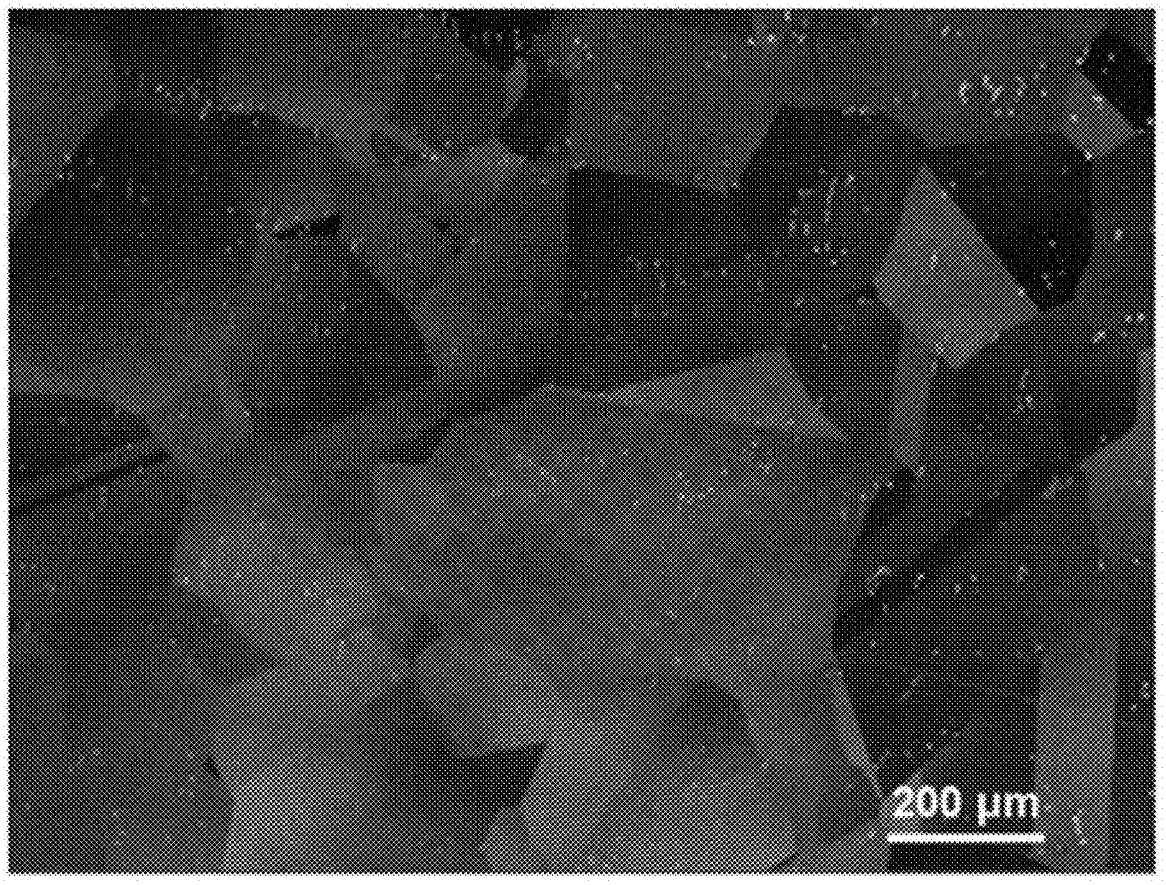
FIG. 26 shows the SEM image of the microstructure of the multi-component soft magnetic alloy obtained according to the comparison embodiment 2 of the present invention.

The microstructure of the obtained multi-component soft magnetic alloy is shown in SEM image as FIG. 26. After homogenization treatment, Comparison Embodiment 2 fails to form a single face-centered cubic structure. Instead, in addition to face-centered cubic structure, a micron-scale intermetallic phase is observed, deteriorating the mechanical and soft magnetic properties of the alloy. A comparison between Embodiment 2 and Comparison Embodiment 2 indicates that the homogenization temperature should be set reasonably to avoid the occurrence of secondary phases.

In the multi-component soft magnetic alloys provided by the present invention, regarding component matching, the following characteristics are present: Firstly, compared with traditional soft magnetic alloys, the multi-component soft magnetic alloys a wide range of component space and controllable microstructure. Secondly, compared with traditional silicon steels or permalloys, the alloy introduces alloying elements such as Al, Ti, Ta, Mo, and Nb. On one hand, by utilizing the significant difference in atomic radii between Al, Ti, Ta, Mo, Nb, and Fe, Co, Ni atoms, large lattice distortions are induced in the FCC matrix, hindering dislocation movement and effectively enhancing the solid solution strengthening effect in the alloy. On the other hand, through aging treatments, a coherent $L1_2$ phase is introduced into the matrix, which improves the alloy's ductility without losing or minimally sacrificing its soft magnetic properties. Through the aforementioned technical measures, the alloys achieve high strength, high ductility, low coercivity, and high saturation magnetization.

The comprehensive effects of introducing Al, Ti, Ta, Mo, and Nb alloying elements into the multi-component soft magnetic alloys provided by the present invention are summarized as follows: 1) The Al element promotes the formation of the coherent ordered structure $Ni_3Al$ of $L1_2$ nano-precipitates, beneficial for improving the ductility of alloys. The presence of Ti, Ta, Mo, and Nb elements can partially replace some Al atoms in $Ni_3Al$, further stabilizing the $L1_2$ phase. 2) The significant difference in atomic radii between Al, Ti, Ta, Mo, Nb, and Fe, Co, Ni atoms can induce large lattice distortions in the face-centered cubic structure matrix, hindering dislocation movement, effectively enhancing the solid solution strengthening effect in the alloys, and further improving strength.

By hot rolling the alloy ingot, defects generated during alloy melting and casting (such as micropores, microcracks, etc.) can be effectively eliminated, improving the comprehensive performance of the alloy. Subsequent homogenization heat treatment can further promote the uniform distribution of various alloying elements in the alloy, forming a uniform face-centered cubic equiaxed crystal structure, ensuring excellent plasticity of the alloy. At the same time, the grain size of the alloy increases under homogenization treatment, which is beneficial for reducing the coercivity of soft magnetic materials.

The multi-component alloys provided by the present invention exhibit a microstructure characterized by a face-centered cubic structure as the matrix. The concentration of ferromagnetic elements Fe, Co, and Ni is ≥84%, ensuring a high saturation magnetization of the alloy. The presence of multiple alloying elements in the alloy significantly enhances the solid solution strengthening effect, ensuring high strength; the introduction of the coherent nanoprecipitates through aging treatments enhances the strength while maintaining the ductility of the alloys, and also enables the alloys to maintain a low coercivity. The excellent combination of strength and ductility with soft magnetic properties makes it suitable for important applications in industries such as electric power, automatic control, and mobile communications.

It should be noted that the above embodiments are only used to illustrate the technical solution of the present invention and are not intended to limit it. Although preferred embodiments have been described with reference to the present invention, those skilled in the art should understand that modifications or equivalents can be made to the technical solution of the present invention without departing from the spirit and scope of the present invention, all of which should be encompassed within the scope of the claims of the present invention.

What is claimed is:

1. A multi-component soft magnetic alloy, comprising the following components in atomic percentage: Fe 32-45%, Co 24-29%, Ni 24-29%, Al 2.5-8%, Ti 1.5-3.5%, Ta 1.0-5%, Nb 0.5%, and Mo 0-2%;

wherein a sum of the atomic percentages of Al, Ti, Ta, Nb, and Mo is ≤16% and ≥5%;

a sum of the atomic percentages of Fe, Co, and Ni is ≥84% and ≤95%;

wherein the soft magnetic alloy is a face-centered cubic (FCC) solid solution structure;

(i) tensile yield strength of 350 to 1350 MPa;

(ii) tensile strength of 600 to 1850 MPa;

(iii) fracture elongation of 15 to 70%;

(iv) saturation magnetization of the alloy from 90 to 140 $A \cdot m^2/kg$;

(v) coercivity of 40 to 650 A/m.

2. The multi-component soft magnetic alloy according to claim 1, wherein Mo is present at an atomic percentage 1.5%.

3. The multi-component soft magnetic alloy according to claim 1, wherein the multi-component soft magnetic alloy is composed of Fe, Co, Ni, Al, Ti, Ta, Mo, and Nb.

4. The multi-component soft magnetic alloy according to claim 3, wherein the multi-component soft magnetic alloy adopts a composition $Fe_{35.2}Co_{26.4}Ni_{26.4}Al_7Ti_{1.5}Ta_{1.5}Mo_{1.5}Nb_{0.5}$.

* * * * *